(12) United States Patent
Kuang et al.

(10) Patent No.: US 12,225,586 B2
(45) Date of Patent: *Feb. 11, 2025

(54) USER EQUIPMENT AND NETWORK NODE INVOLVED IN COMMUNICATION

(71) Applicant: Panasonic Intellectual Property Corporation of America, Torrance, CA (US)

(72) Inventors: Quan Kuang, Langen (DE); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/365,132

(22) Filed: Aug. 3, 2023

(65) Prior Publication Data

US 2023/0379970 A1    Nov. 23, 2023

Related U.S. Application Data

(63) Continuation of application No. 17/502,882, filed on Oct. 15, 2021, now Pat. No. 11,778,665, which is a
(Continued)

(30) Foreign Application Priority Data

May 2, 2019   (EP) ..................................... 19172321

(51) Int. Cl.
*H04W 74/0816*   (2024.01)
*H04L 27/26*    (2006.01)
(Continued)

(52) U.S. Cl.
CPC ... *H04W 74/0816* (2013.01); *H04L 27/26025* (2021.01); *H04W 52/36* (2013.01); *H04W 74/0866* (2013.01)

(58) Field of Classification Search
None
See application file for complete search history.

(56) References Cited

U.S. PATENT DOCUMENTS 10,785,788 B2 *  9/2020  Kim .................... H04L 25/02
11,778,665 B2 * 10/2023  Kuang ............. H04W 74/0866
                                                    370/329
(Continued)

FOREIGN PATENT DOCUMENTS

EP    3525523 A1 *  8/2019  ........ H04W 52/0216
EP    3876628 A1 *  9/2021  ........... H04L 5/0058
(Continued)

OTHER PUBLICATIONS

Samsung, "CCA slot and tx-rx/rx-tx switching time," 3GPP TSG RAN WG1 #86bis, Lisbon, Portugal, Oct. 10-14, 2016, R1-1608982 (Year: 2016).*
(Continued)

*Primary Examiner* — Andrew C Oh
(74) *Attorney, Agent, or Firm* — Seed IP Law Group LLP

(57) ABSTRACT

Provided are a user equipment (UE), a base station and respective transmission/reception methods for UE and base station. The UE comprises circuitry which, in operation, determines, based on a type of a transmission, a time interval between an outer boundary of a transient period for ramping of power to start or finish the transmission and a symbol on which a signal included in the transmission is to be transmitted; and a transceiver which, in operation, transmits the signal on the symbol; wherein the time interval and a time window for clear channel assessment (CCA) are non-overlapping.

9 Claims, 15 Drawing Sheets

Related U.S. Application Data continuation of application No. PCT/EP2020/061541, filed on Apr. 24, 2020.

(51) Int. Cl.
*H04W 52/36* (2009.01)
*H04W 74/08* (2009.01)

(56) References Cited

U.S. PATENT DOCUMENTS

| | | | |
|---|---|---|---|
| 2013/0114505 A1* | 5/2013 | Haim | H04W 52/32 370/328 |
| 2013/0272230 A1* | 10/2013 | Dinan | H04W 52/40 370/329 |
| 2013/0272231 A1* | 10/2013 | Dinan | H04W 76/27 370/329 |
| 2013/0272232 A1* | 10/2013 | Dinan | H04W 72/20 370/329 |
| 2013/0272233 A1* | 10/2013 | Dinan | H04L 5/0094 370/329 |
| 2013/0279435 A1* | 10/2013 | Dinan | H04W 72/0446 370/329 |
| 2014/0376471 A1 | 12/2014 | Nishio et al. | |
| 2015/0031410 A1* | 1/2015 | Lim | H04W 52/146 455/522 |
| 2016/0183219 A1* | 6/2016 | Kim | H04W 52/38 370/329 |
| 2016/0301556 A1* | 10/2016 | Nory | H04L 27/2662 |
| 2016/0323915 A1 | 11/2016 | Liu et al. | |
| 2017/0135080 A1* | 5/2017 | Xia | H04L 1/1822 |
| 2018/0007688 A1* | 1/2018 | Fu | H04W 72/0446 |
| 2018/0124815 A1 | 5/2018 | Papasakellariou | |
| 2018/0206129 A1* | 7/2018 | Choi | H04W 74/0808 |
| 2018/0220441 A1* | 8/2018 | Akula | H04W 72/1268 |
| 2018/0278393 A1 | 9/2018 | Akula et al. | |
| 2018/0278403 A1* | 9/2018 | Yerramalli | H04L 5/0092 |
| 2019/0141650 A1* | 5/2019 | Lim | H04W 4/70 |
| 2019/0150097 A1 | 5/2019 | Seo et al. | |
| 2019/0150174 A1* | 5/2019 | Kim | H04W 72/23 370/330 |
| 2019/0191433 A1* | 6/2019 | Park | H04L 27/2666 |
| 2019/0199502 A1* | 6/2019 | Wang | H04W 72/0446 |
| 2019/0246416 A1 | 8/2019 | Park et al. | |
| 2019/0342838 A1 | 11/2019 | Kwak et al. | |
| 2019/0373600 A1 | 12/2019 | Takeda et al. | |
| 2019/0380064 A1 | 12/2019 | Salem et al. | |
| 2020/0059871 A1 | 2/2020 | Ryu et al. | |
| 2020/0228991 A1* | 7/2020 | Jiang | H04W 74/0808 |
| 2020/0351667 A1 | 11/2020 | Karaki et al. | |
| 2020/0366438 A1 | 11/2020 | Rahman et al. | |
| 2020/0383060 A1 | 12/2020 | Park et al. | |
| 2021/0014003 A1* | 1/2021 | Sundberg | H04L 1/1822 |
| 2021/0021454 A1 | 1/2021 | Horiuchi et al. | |
| 2021/0058969 A1 | 2/2021 | Ahn et al. | |
| 2021/0136754 A1 | 5/2021 | Ahlander et al. | |
| 2021/0153250 A1 | 5/2021 | Jiang et al. | |
| 2021/0282170 A1 | 9/2021 | Falconetti et al. | |
| 2021/0298046 A1* | 9/2021 | Li | H04W 52/367 |
| 2022/0039130 A1 | 2/2022 | Zhou | |

FOREIGN PATENT DOCUMENTS

| | | | | |
|---|---|---|---|---|
| WO | WO 2016017355 A1 | 2/2016 | | |
| WO | WO-2016163709 A1 * | 10/2016 | | H04L 1/1812 |
| WO | WO-2017142469 A1 * | 8/2017 | | H04L 1/0083 |
| WO | WO-2017194167 A1 * | 11/2017 | | H04L 1/0003 |
| WO | WO-2018083652 A1 * | 5/2018 | | H04L 5/0053 |
| WO | WO 2018143856 A1 | 8/2018 | | |
| WO | WO-2018143879 A1 * | 8/2018 | | |
| WO | WO-2018143882 A1 * | 8/2018 | | H04L 5/0048 |
| WO | WO-2018174802 A1 * | 9/2018 | | H04L 5/0053 |
| WO | WO-2018229277 A1 * | 12/2018 | | H04L 27/2602 |
| WO | WO 2018236276 A1 | 12/2018 | | |

OTHER PUBLICATIONS

Flores et al., "Modified MIMO Resonant Controller Robust to Period Variation and Parametric Uncertainty," 2016 IEEE Conference on Control Applications (CCA). Part of 2016 IEEE Multi-Conference on Systems and Control, Sep. 19-22, 2016, Buenos Aires, Argentina, pp. 1256-1261, 6 pages.

3GPP TR 38.889 V16.0.0, "3rd Generation Partnership Project; Technical Specification Group Radio Access Network; Study on NR-based access to unlicensed spectrum (Release 16)," Dec. 2018, 119 pages.

3GPP TS 36.101 V16.1.0, "3rd Generation Partnership Project; Technical Specification Group Radio Access Network; Evolved Universal Terrestrial Radio Access (E-UTRA); User Equipment (UE) radio transmission and reception (Release 16)," Mar. 2019, 1843 pages.

3GPP TS 36.211 V15.4.0, "3rd Generation Partnership Project; Technical Specification Group Radio Access Network; Evolved Universal Terrestrial Radio Access (E-UTRA); Physical channels and modulation (Release 15)," Dec. 2018, 240 pages.

3GPP TS 37.213 V15.1.0, "3rd Generation Partnership Project; Technical Specification Group Radio Access Network; Physical layer procedures for shared spectrum channel access (Release 15)," Sep. 2018, 20 pages.

3GPP TS 38.101-1 V15.5.0, "3rd Generation Partnership Project; Technical Specification Group Radio Access Network; NR; User Equipment (UE) radio transmission and reception; Part 1: Range 1 Standalone (Release 15)," Mar. 2019, 239 pages.

3GPP TS 38.211 V15.3.0, "3rd Generation Partnership Project; Technical Specification Group Radio Access Network; NR; Physical channels and modulation (Release 15)," Sep. 2018, 96 pages.

Extended European Search Report, mailed Feb. 20, 2020, for corresponding European Application No. 19172321.2-1205, 18 pages.

InterDigital Inc., "NR Sidelink Resource Allocation Mechanism for Mode 2," R1-1905402, Agenda Item: 7.2.4.2.2, 3GPP TSG RAN WG1 #96bis, Xi'an, China, Apr. 8-12, 2019, 7 pages.

International Search Report, mailed Sep. 2, 2002, for corresponding International Application No. PCT/EP2020/061541, 5 pages.

LG Electronics, "Consideration on SRS and following PUSCH," R1-166816, Agenda Item: 7.2.1.2, 3GPP TSG RAN WG1 meeting #86, Gothenburg, Sweden, Aug. 22-26, 2016, 3 pages.

Partial European Search Report, mailed Nov. 14, 2019, for corresponding European Application No. 19172321.2-1219, 21 pages.

Samsung, "CCA slot and tx-rx/rx-tx switching time," R1-1608982, Agenda Item: 7.1.7, 3GPP TSG RAN WG1 #86bis, Lisbon, Portugal, Oct. 10-14, 2016, 4 pages.

Japanese Notice of Reasons for Rejection dated May 7, 2024, for the corresponding Japanese Patent Application No. 2021-564197, 14 pages. (With English Translation).

LG Electronics, "Channel access procedure for NR-U," R1-1904622, Agenda Item: 7.2.2.2.1, 3GPP TSG RAN WG1 Meeting #96bis, Xi'an, China, Apr. 8-12, 2019, 12 pages.

* cited by examiner

USER EQUIPMENT AND NETWORK NODE INVOLVED IN COMMUNICATION

BACKGROUND

Technical Field

The present disclosure relates to transmission and reception of signals in a communication system. In particular, the present disclosure relates to methods and apparatuses for such transmission and reception.

Description of the Related Art

The 3rd Generation Partnership Project (3GPP) works at technical specifications for the next generation cellular technology, which is also called fifth generation (5G) including "New Radio" (NR) radio access technology (RAT), which operates in frequency ranges from sub-1 GHz to millimeter wave bands. The NR is a follower of the technology represented by Long Term Evolution (LTE) and LTE Advanced (LTE-A).

For systems like LTE, LTE-A, and NR, further modifications and options may facilitate efficient operation of the communication system as well as particular devices pertaining to the system.

BRIEF SUMMARY

One non-limiting and exemplary embodiment facilitates reliable transmission of signals with high service requirements in an unlicensed spectrum.

In an embodiment, the techniques disclosed herein feature a user equipment (UE) comprising circuitry which, in operation, determines, based on a type of a transmission, a time interval between an outer boundary of a transient period for ramping of power to start or finish the transmission and a symbol on which a signal included in the transmission is to be transmitted, and a transceiver which, in operation, transmits the signal on the symbol, wherein the time interval and a time window for clear channel assessment, CCA, are non-overlapping.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following, exemplary embodiments are described in more detail with reference to the attached figures and drawings.

DETAILED DESCRIPTION

Figure 1:
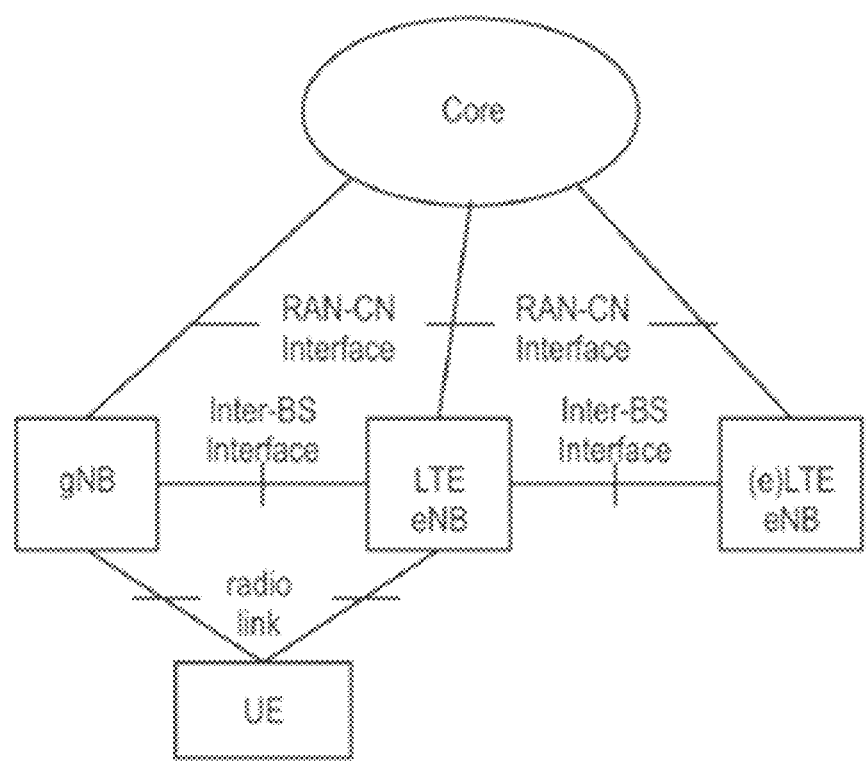
FIG. 1 shows an exemplary architecture for a 3GPP NR system including exemplary user and control plane architecture for the LTE eNB, gNB, and UE.

FIG. 1 shows an exemplary example of a communication system including a base station and a terminal and a core network. Such communication system may be a 3GPP system such as NR and/or LTE and/or UMTS. For example, as illustrated in FIG. 1, the base station (BS) may be a gNB (gNodeB, e.g., an NR base station) or an eNB (eNodeB, e.g., an LTE base station). However, the present disclosure is not limited to these 3GPP systems or to any other systems. Even though the embodiments and exemplary implementations are described using some terminology of 3GPP systems, the present disclosure is also applicable to any other communication systems, and in particular in any cellular, wireless and/or mobile systems.

The NR is planned to facilitate providing a single technical framework addressing several usage scenarios, requirements and deployment scenarios defined including, for instance, enhanced mobile broadband (eMBB), ultra-reliable low-latency communications (URLLC), massive machine type communication (mMTC), and the like. For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include scenarios with large number of devices with non-time critical data transfers such as smart wearables and sensor networks. The services eMBB and URLLC are similar in that they both demand a very broad bandwidth, however are different in that the URLLC service requires ultra-low latencies. In NR, the physical layer is based on time-frequency resources (such as Orthogonal Frequency Division Multiplexing, OFDM, similar to LTE) and may support multiple antenna operation.

A terminal is referred to in the LTE and NR as a user equipment (UE). This may be a mobile device such as a wireless phone, smartphone, tablet computer, or an USB (universal serial bus) stick with the functionality of a user equipment. However, the term mobile device is not limited thereto, in general, a relay may also have functionality of such mobile device, and a mobile device may also work as a relay.

A base station is a network node, e.g., forming a part of the network for providing services to terminals. A base station is a network node, which provides wireless access to terminals.

In 3GPP, NR-based operation in an unlicensed spectrum (NR-U) is studied (see, e.g., 3GPP TR 38.889, Study on NR-based access to unlicensed spectrum, v16.0.0). NR-U may operate in a sub-7 GHz band at 5 GHz or 6 GHz. However, the present disclosure is not restricted to a particular band and may also be applied to a millimeter wave band at, e.g., 52 GHz.

The Listen-Before-Talk (LBT) procedure is defined as a mechanism by which a device such as a base station or a user equipment (UE) applies a clear channel assessment (CCA) check before using the channel. The CCA utilizes at least energy detection to determine the presence or absence of other signals on a channel in order to determine if a channel is occupied or clear, respectively. European and Japanese regulations, for instance, mandate the usage of LBT in the unlicensed bands. Apart from regulatory requirements, this carrier sensing via LBT is one way for fair sharing of the unlicensed spectrum, and hence it is considered to be a vital feature for fair and friendly operation in the unlicensed spectrum in a single global solution framework.

The channel is considered occupied if the detected energy level exceeds a configured CCA threshold (e.g., for Europe, −73 dBm/MHz, see ETSI 301 893, under clause 4.8.3), and conversely is considered to be free if the detected power level is below the configured CCA threshold. If the channel is classified as free, the device is allowed to transmit immediately. The maximum transmit duration is restricted in order to facilitate fair resource sharing with other devices operating on the same band.

In unlicensed band operation, after acquiring the channel by LBT, an initiating device (e.g., a scheduling device such as an NR gNB or LTE eNB) can occupy the channel up to a maximum channel occupancy time (COT). For instance, depending on the LBT requirement, a maximum COT may be assumed to be 8 ms or 9 ms, e.g., for a subcarrier spacing of 15 kHz, a COT of 8 ms corresponds to 8 slots, and for a subcarrier spacing of 30 kHz, it corresponds to 16 slots.

The initiating device (e.g., gNB) may share the acquired time-frequency resources with responding devices (e.g., one or more transceiver devices such as UEs). Sharing the acquired time-frequency resources may facilitate allowing flexible resource usage among uplink (UL) and downlink (DL). For instance, DL and UL resources can be re-allocated based on the traffic demand in the respective directions.

Moreover, the sharing of the acquired resources may facilitate allowing UL transmission with one-shot LBT (without random back-off), in the gNB's acquired COT. In particular, as captured in 3GPP TR 38.889, Study on NR-based access to unlicensed spectrum, v16.0.0, Table 7.2.1.3.1-3, for the case where a UL transmission in a gNB-initiated COT is not followed by another DL transmission in the same COT, a Cat-2 LBT is used for UE to sense the channel before performing UL transmission, meaning that the duration of time that the channel is sensed to be idle before the UL transmission is deterministic.

In addition, semi-statically configured or periodic reference signals, signaling, or data transmission can be made possible by sharing the acquired time-frequency resources, e.g., if semi-statically configured UL transmission configured by higher layers was within the gNB's COT, but no UL resources were shared by the gNB, then UL transmission would need to be dropped.

However, COT can also be initiated by a UE instead of a gNB. In such cases, UE needs to perform LBT to make sure the channel is not occupied by other devices before acquiring the channel for transmission. Comparing the case where UE performs LBT within a COT initiated already by gNB, the chance of collision is higher. Therefore, the LBT needs to take into account more uncertainties. For example, as captured in 3GPP TR 38.889, Study on NR-based access to unlicensed spectrum, v16.0.0, Table 7.2.1.3.1-4, if UE wants to transmit PUSCH as an initiating device for a COT, a Cat-4 LBT needs to be performed, meaning that a LBT with random back-off with a contention window of variable size is used (see section 8.2 channel access schemes in 3GPP TR 38.889, Study on NR-based access to unlicensed spectrum, v16.0.0). Basically, the UE draws a random number N within a contention window. The size of the contention window is specified by the minimum and maximum value of N. The UE can vary the size of the contention window when drawing the random number N. The random number N is used in the LBT procedure to determine the duration of time that the channel is sensed to be idle before the UE can transmit.

Clear channel assessment (CCA) may be performed at the end of a slot, and the COT may with the first symbol (OFDM symbol) of the slot following the slot in which the clear channel assessment is performed. However, different opportunities or time instances may be considered at which an initiating device may acquire the channel, e.g., opportunities may be at every second symbol or twice per slot. Accordingly, CCA may also be performed at in symbols spaced apart from the end of a slot.

Figure 2:
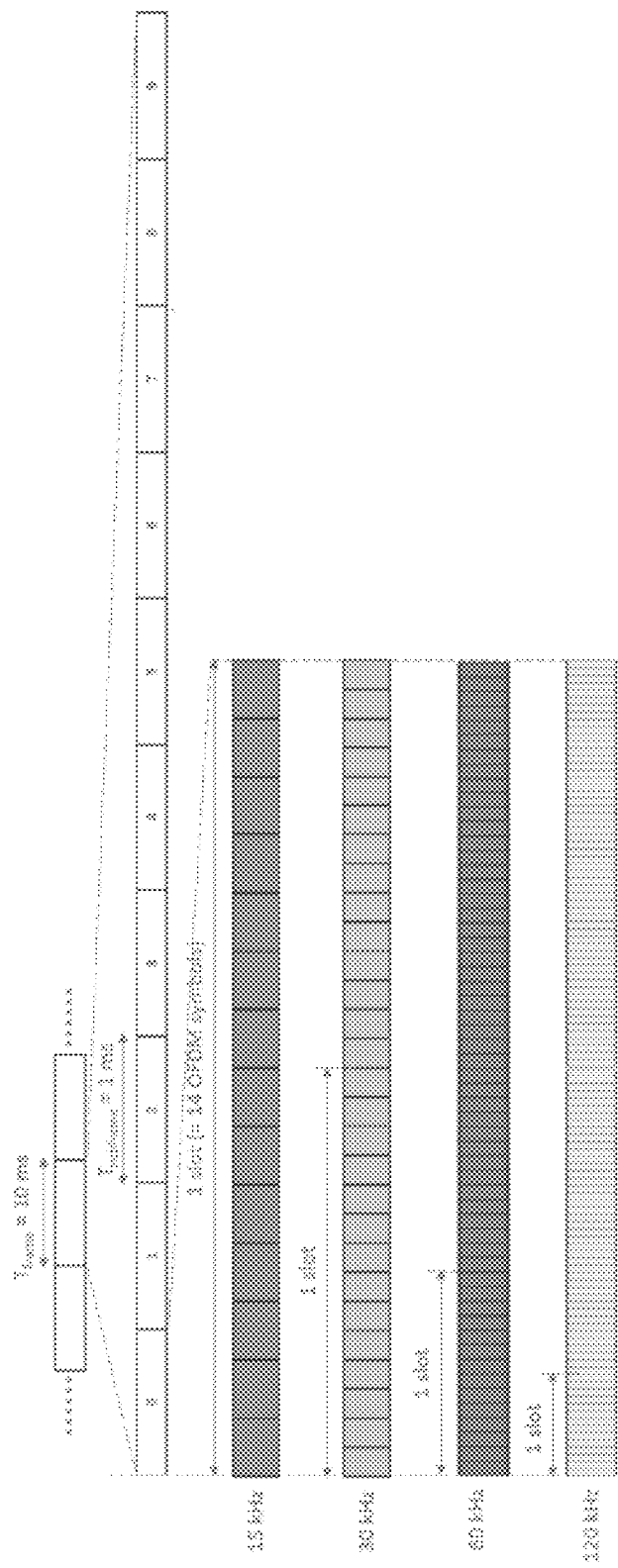
FIG. 2 is a schematic drawing frame, subframe and slot for different sub-carrier spacing.

In slot-based scheduling or assignment, a slot corresponds to the timing granularity (TTI—transmission time interval) for scheduling assignment. In general, TTI determines the timing granularity for scheduling assignment. One TTI is the time interval in which given signals is mapped to the physical layer. For instance, conventionally, the TTI length can vary from 14-symbols (slot-based scheduling) to 2-symbols (non-slot based scheduling). Downlink (DL) and uplink (UL) transmissions are specified to be organized into frames (10 ms duration) consisting of 10 subframes (1 ms duration). In slot-based transmission, a subframe is further divided into slots, the number of slots being defined by the numerology/subcarrier spacing, as shown in FIG. 2. The specified values range between 10 slots per frame (1 slot per subframe) for a subcarrier spacing of 15 kHz to 80 slots per frame (8 slots per subframe) for a subcarrier spacing of 120 kHz. The number of OFDM symbols per slot is 14 for normal cyclic prefix and 12 for extended cyclic prefix (see section 4.1 (general frame structure), 4.2 (Numerologies), 4.3.1 (frames and subframes) and 4.3.2 (slots) of the 3GPP TS 38.211 V15.3.0, Physical channels and modulation, 2018-09). However, assignment of time resources for transmission may also be non-slot based. In particular, the TTIs in non slot-based assignment may correspond to mini-slots rather than slots, i.e., one or more mini-slots may be assign to a requested transmission of data/control signaling. In non slot-based assignment, the minimum length of a TTI may for instance be 1 or 2 OFDM symbols.

When a transmission device starts a transmission of a burst in an unlicensed spectrum, such as a UE transmitting an UL burst, it may be necessary to change the RF (radio frequency) state of the transmitter. A transient period is the time period necessary for the transmitter to change its RF state, such as from power OFF to ON, and ON to OFF.

In the transient period, the transmit power varies and increases or decreases from/to a value below or equal to a threshold for an OFF power requirement to/from a value above or equal to a threshold for an ON power requirement. The value the transmit power during the transient period is undefined in the standard specifications.

Figure 3:
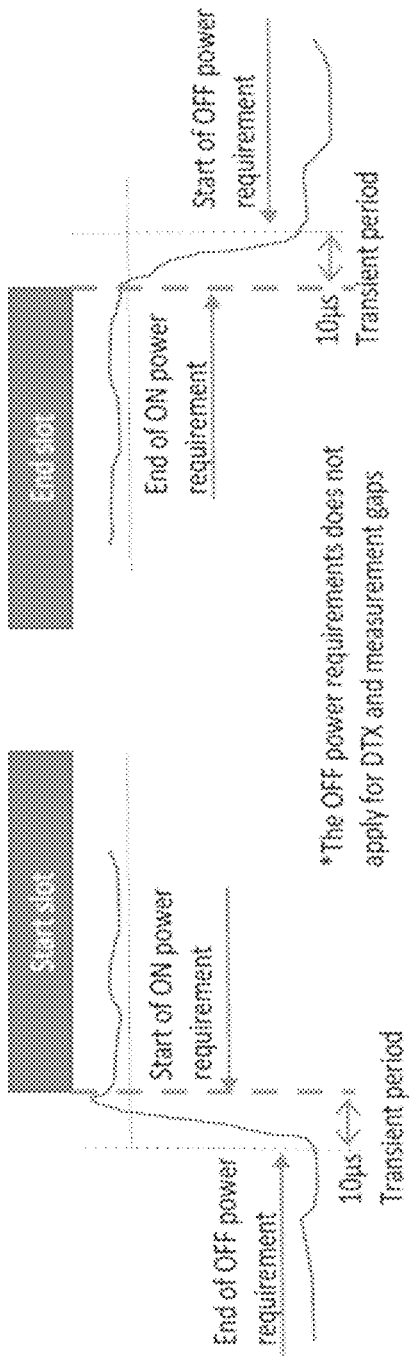
FIG. 3 is a graph showing examples of transient periods in NR.

Instead, the maximum allowable transient period length is defined in the standard specifications, e.g., in frequency range 1 (FR1), a UE can have a transient period of up to 10 us (see 3GPP TS 38.101-1 V15.5.0 (2019-03), User Equipment (UE) radio transmission and reception; Part 1: Range 1 Standalone (Release 15)). FR1 is the frequency range from 410 MHz to 7125 MHz, where subcarrier-spacings (SCS) 15 kHz, 30 kHz, 60 kHz are used for data channel. As one example of a transient period for NR UL transmission, a general ON/OFF time mask for NR UL transmission in FR1 is shown in FIG. 3 (cf. FIG. 6.3.3.2-1 in 3GPP 38.101-1).

Moreover, in FR2, a UE can have up to 5 us transient period (see 3GPP TS 38.101-1 V15.5.0 (2019-03), User Equipment (UE) radio transmission and reception; Part 2: Range 2 Standalone (Release 15)). FR2 is frequency range from 24250 MHz to 52600 MHz, where SCS 60 kHz and 120 kHz are used for data channel.

As discussed, for unlicensed operation, CCA needs to be performed in unlicensed operation. Moreover, in typical scenarios, a device needs to perform CCA before any transmission. A scheme for unlicensed operation is provided for LTE-LAA (License-Assisted Access) systems. LTE-LAA provides respective frame structures for licensed band operation and for unlicensed band operation, namely types 1 and 2 (licensed band operation) and type 3 (unlicensed band operation).

Figure 4:
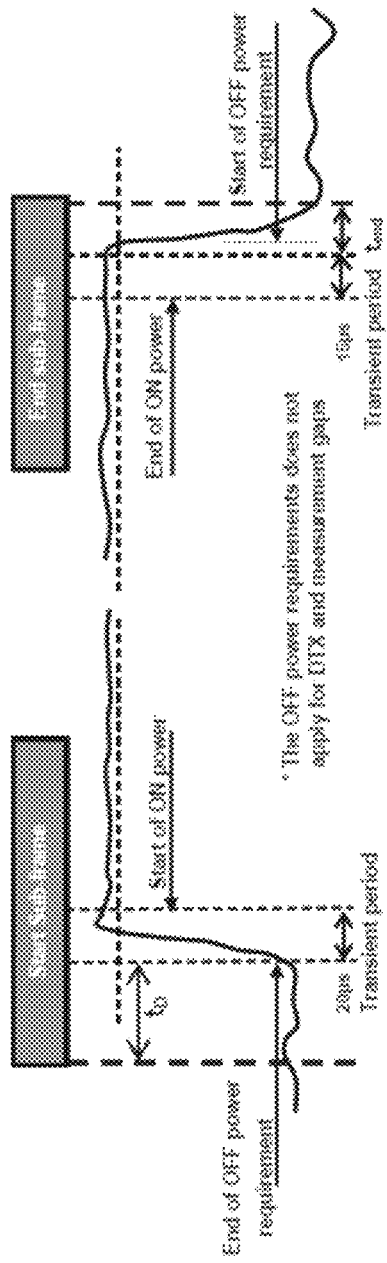
FIG. 4 is a graph showing examples of transient periods in LTE-LAA (License-Assisted Access)

On the one hand, type-3 frame structure is dedicated for unlicensed operation. A general ON/OFF time mask for subframe TTI and for Frame Structure Type 3 is shown in FIG. 4 (see 3GPP TS 36.101 V16.1.0 (2019-03), Evolved Universal Terrestrial Radio Access (E-UTRA); User Equipment (UE) radio transmission and reception, FIG. 6.3.4.1-1A). As can be seen from FIG. 4, in the time mask for Frame Structure Type 3, the transient period is absorbed by the Tx (transmission/transmitter) burst (a transmission in an unlicensed spectrum) itself. Therefore, CCA can be performed outside the burst (for instance during period $t_D$) without overlapping with the transient period in FIG. 4.

On the other hand, licensed band operations use Frame Structure Type 1 or Type 2, which are not applicable for unlicensed band operations for the following reasons. Namely, Frame Structure Type 1 is only applicable for FDD (frequency division duplex), and therefore cannot be applied to the unlicensed band operation which is base on TDD (time division duplex).

Furthermore, Frame Structure Type 2 is applicable for TDD, but provides configurations with fixed uplink and downlink ratio. And such uplink-downlink configuration pattern is always defined for a duration of 10 subframes (see Table 4.2-2 Uplink-downlink configurations in 3GPP TS 36.211 v15.4.0). Thus, Type 2 is not suitable for unlicensed band operation (or unlicensed operation for short) where a greater flexibility for the transmission positions, for instance for of UL bursts and DL bursts, as well as the flexibility in terms of the duration of the channel occupancy, is needed. Another important factor that makes Frame Structure Type 2 inapplicable to unlicensed band operation is the lack of time gap for performing CCA. In contrast, as shown in FIG. 4, at the beginning of the sub-frame, a gap of no transmission can be created by the parameter $t_D$, where CCA can be performed before the actual transmission after $t_D$.

If the time mask for Frame Structure Type 3 from LTE-LAA is reused in NR-U, the front and rear symbols of a Tx burst will be affected by the transient period. This impact of the transient period on these symbols may become particularly relevant for NR-U operating with higher/broader SCS corresponding to shorter symbol durations or for bursts starting and/or ending with high-priority symbols requiring a high reliability, such as reference symbols.

Figure 5:
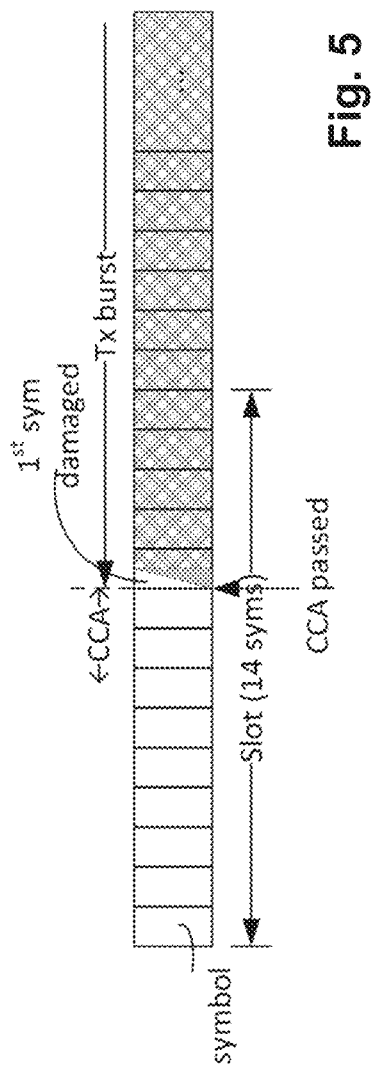
FIG. 5 is a schematic drawing a schematic example of a CCA followed immediately by a transmission.

If CCA succeeds at the beginning of a symbol boundary and the Tx burst starts immediately, the first symbol of the burst will be affected by the transient period. This is shown in FIG. 5. As a consequence, the first symbol (or a signal transmitted on the first symbol) may be damaged (e.g., cannot be recovered on the receiving side due to the transmit power not having reached a sufficient strength), which affects the reliability transmission and reception in the communication system or the quality of service of the communication system.

The present disclosure provides techniques for facilitating providing transmission and reception reliability. Techniques are provided for transient period handling for NR unlicensed operations or unlicensed operations in similar systems. Embodiments of the disclosure feature a communication device such as a user equipment (UE), a base station (e.g., a NR gNB), and respective transmission and reception methods for communication devices such as a UE and a base station.

Figure 6:
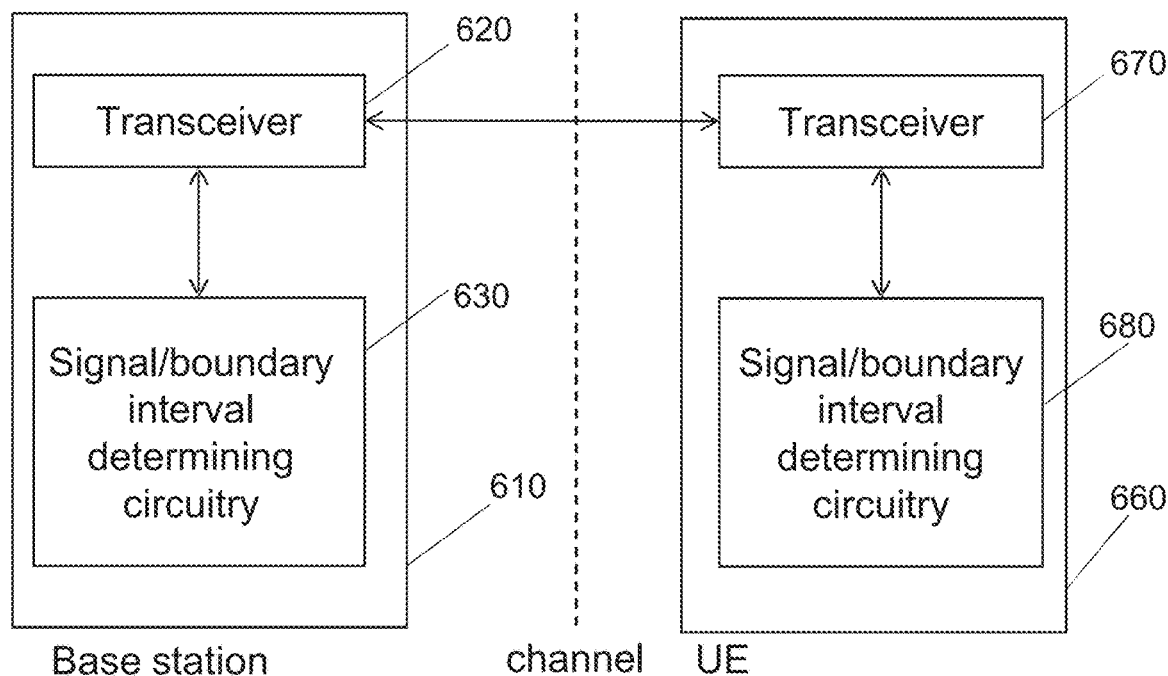
FIG. 6 is a block diagram of a base station and a UE according to some embodiments.

As shown in FIG. 6, provided is a UE 660 comprising a transceiver 670 (or a "UE transceiver") and circuitry 680 (or "UE circuitry"), and a base station 610 comprising a transceiver 620 (or a "base station transceiver") and circuitry 630 (or "base station circuitry"). For instance, base station and UE communicate with each other over a channel such as a wireless channel in a communication system such as NR (or NR-unlicensed). The UE 660 transmits signals to and receives signals from the base station 610, and vice versa.

In the following, the terms "circuitry" and "transceiver" shall encompass UE circuitry 680 and UE transceiver 670 as well as base station circuitry 630 and base station transceiver 620, unless the context or implicit reference indicates otherwise. The circuitry 630, 680 is processing circuitry such as a processor. A transceiver 620, 670 comprises hardware components such as one or more antennas and software components controlling the operation of the hardware components.

The circuitry, in operation, determines, based on a type of transmission, a time interval (length) between an outer boundary of a transient period in which the transceiver is to perform ramping of power to start or finish the transmission and a symbol on which a signal included in the transmission is to be transmitted (a symbol onto which a signal or data is mapped). The transceiver 620, 670, in operation, performs the transmission and therein, transmits the signal on the symbol (or in the symbol). The time interval and a time window for clear channel assessment, CCA, are non-overlapping. The time interval or the length (duration) of the time interval depends on the type of the transmission.

The "outer boundary" is the boundary of the transient period in which the power value passes the threshold for the "OFF" requirement, i.e., the earlier boundary if the transmission power is turned from OFF to ON state at the beginning of the transmission, or the later boundary if the transmission power is turned from ON to OFF at the end of the transmission/burst. Accordingly, in case of the OFF-to-ON transient period, the distance between the outer boundary and the symbol is the distance between the earlier boundary of the transient period and the earlier symbol boundary in time direction (the beginning of the symbol). In case of the ON-to-OFF transient period, the distance between the outer boundary and the symbol is the distance between the later symbol boundary in time direction (at the end of the symbol and the later boundary of the transient period.

The transmission may be a (Tx) burst in an unlicensed spectrum comprising one or more OFDM symbols, and the symbol is an OFDM symbol included in the transmission. As will be explained, the CCA may be a CCA for the transmission (i.e., the current transmission to be performed by the UE 660 or base station 610), or a future transmission performed after the current transmission by the base station 610 (a DL burst), the UE 660 or some other UE different from UE 660. In particular, in case of the OFF-to ON transient period, the CCA is a CCA for the current transmission, and in case of the ON-to-OFF transient period, the CCA is a CCA for a future transmission.

The time window for CCA is referred to as the time duration where the channel is actually measured. For example, as specified in 3GPP TS 37.213 v15.1.0 Physical layer procedures for shared spectrum channel access, section 4.1.1, A slot duration $T_{sf}$ (which is 9 us) is considered to be idle if the eNB senses the channel during the slot duration, and the power detected by the eNB for at least 4 us within the slot duration is less than energy detection threshold $X_{Thresh}$. Otherwise, the slot duration $T_{sl}$ is considered to be busy. In other words, if CCA consists of only one slot duration $T_{sl}$ of 9 us, the actual measuring window may be only 4 us. With such understanding, what is required to be non-overlapping is between the defined time interval and the actual measuring window for CCA instead of the whole duration of CCA, e.g., 4 us time duration in the above example.

Moreover, as will also be described further, the type of transmission includes a type of the signal, such as control signal, reference signal, preamble, or data signal, the symbol position of the signal of a specific type within the transmission, and/or properties of the numerology such as an SCS and its associated symbol length/duration. The transmission type may further include a duration of the transmission or burst.

Figure 7:
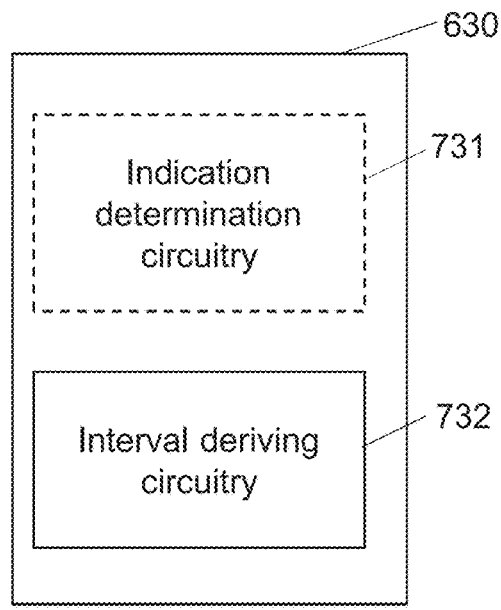
FIG. 7 is a block diagram showing processing circuitry of a base station.
Figure 8:
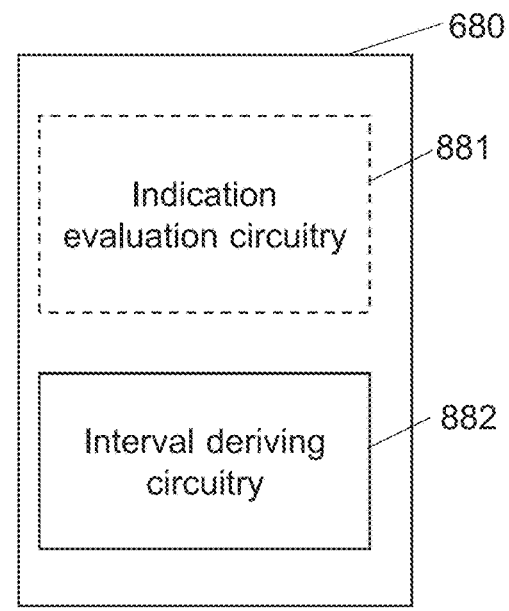
FIG. 8 is a block diagram showing processing circuitry of a UE.

An exemplary base station circuitry 630 determining the interval between an outer boundary of the transient period and a symbol ("signal/boundary interval determining circuitry") is shown in FIG. 7. For instance, processing circuitry 630 comprises interval deriving circuitry 732. Circuitry 630 may further comprise indication determination circuitry 731. Exemplary signal/boundary interval determining circuitry 680 of the UE 660 is shown in FIG. 8. For instance, UE circuitry 680 comprises interval deriving circuitry 882, and may further include indication evaluation circuitry 881.

Figure 9:
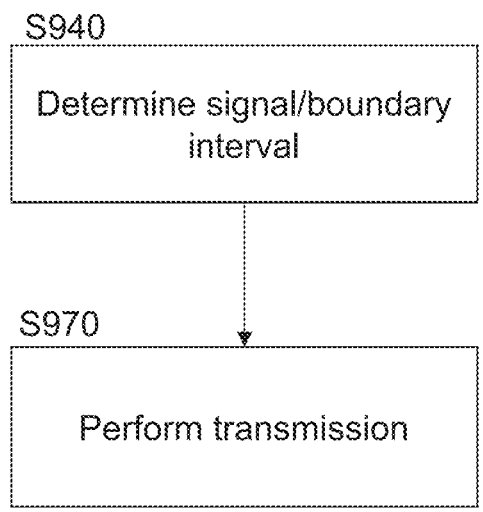
FIG. 9 is a flow chart of a transmission method for a communication device.

In correspondence with the aforementioned UE and base station, disclosed are a transmission method and a reception method for a communication device such as a UE and a base station shown in FIG. 9. The transmission method for a UE or base station comprises step S940 of determining, based on a type of a transmission, a time interval between an outer boundary of a transient period for ramping of power to start or finish the transmission and a symbol on which a signal included in the transmission is to be transmitted. The transmission method further comprises step S970 of transmitting the signal on the symbol. Then the time interval and a time window for clear channel assessment, CCA, are non-overlapping. The reception method comprises a step of receiving the transmission rather than step S970 of performing the transmission.

In the following, exemplary embodiments of the above-described UE, base station, and the respectively corresponding communication methods (transmission and reception methods for base station and UE) will be described. Unless explicitly stated or indicated by the context, the following description applies to methods as well as apparatuses and to base station as well as UE.

In some embodiments, the symbol on which the signal is transmitted is located at a time boundary of the transmission. For instance, the signal is allocated to a first symbol or a last symbol of a Tx burst in time direction.

For instance, as the time interval between the outer boundary and the symbol, a "guard period" (or offset or "explicit transient period") is defined or provided before and/or after a Tx burst boundary (the time boundary of the transmission, which is also the time boundary of the symbol on which the signal is transmitted if the symbol is at the time boundary of the transmission). In the time interval (or guard period, offset), CCA measurements are not to be performed. In this disclosure, the term "guard period" refers to a time period in which power ramping for a burst, but no CCA (measurement), may be performed, and which is set to protect a result of a CCA from influence caused by power ramping and, if necessary, to allow for a sufficiently strong symbol strength for facilitating successful transmission/reception of important symbols which require a high reliability.

Examples of time intervals/guard periods include a front guard period at a start boundary of a transmission and a rear guard period at an end boundary of the transmission.

On the one hand, a front guard period (or front offset/front explicit transient period) between CCA for the (current) transmission and the beginning of the first symbol of the transmission/Tx burst is usable for accommodating, at least partially, the transient period of power from OFF to ON (the above mentioned OFF-to-ON transient period).

On the other hand, a rear guard period (rear offset/rear explicit transient period) may be set between the end of the last symbol and a next (possible) CCA to be performed by a device in the communication system, and is usable for accommodating, at least partially, the transient period of power from ON to OFF (ON-to OFF transient period).

Figure 10:
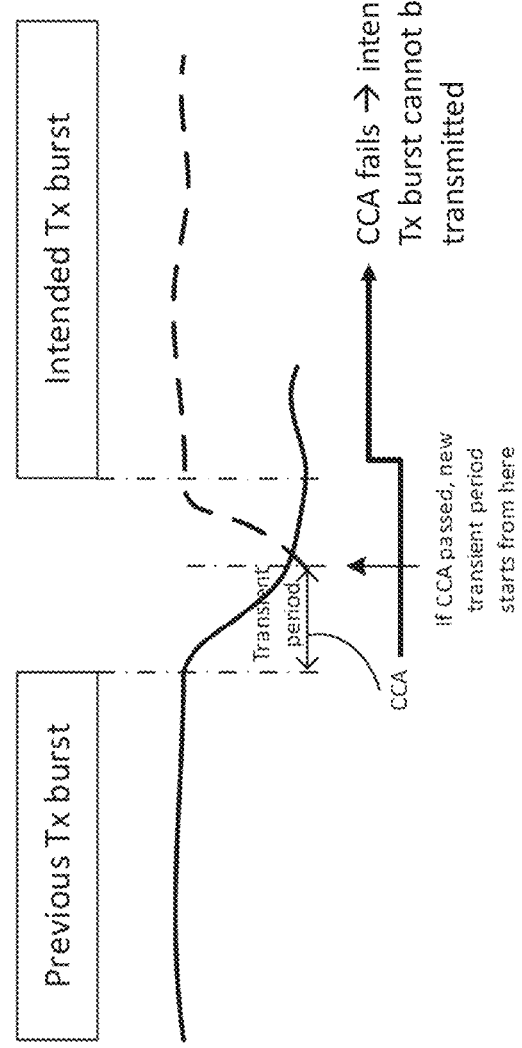
FIG. 10 is a schematic illustration of transient periods at the end and at the start of two subsequent transmissions.

An example of an ON-to-OFF transient period of a previous burst followed by an OFF-to-ON transient period of an intended Tx burst is illustrated in FIG. 10. As has been discussed above, a transmission of a symbol possibly including an important signal during the transient period may jeopardize successful transmission of the signal and, depending on the importance of the signal such as a control or reference signal, successful transmission of the burst. To facilitate successful transmission of the burst, a guard period at the beginning of the transmission can be defined/set in which power is ramped on.

In addition, as shown in FIG. 10, if the CCA before the intended transmission measures a certain amount of residual power due to the transient period of a previous transmission, the channel may be blocked unnecessarily due to a failed CCA. It can thus be seen that a transient period after a Tx burst in which the transmit power is ramped off can also affect a CCA performed for later transmissions. Accordingly, a time interval or guard period between a last symbol of a transmission and an outer boundary of an ON-to-OFF transient period which does not overlap with a CCA period or window for later/future transmission may facilitate the CCA for the future transmission.

Figure 11:
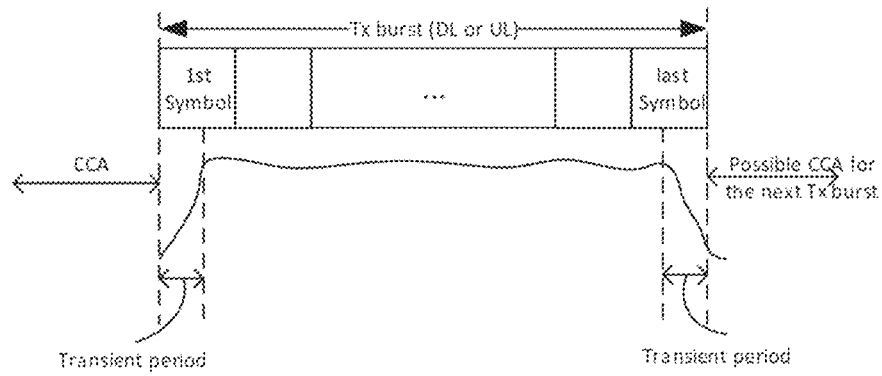
FIGS. 11-13 show time intervals (guard periods) between the start/end of power ramping and a first/last symbol of a transmission.
Figure 12:
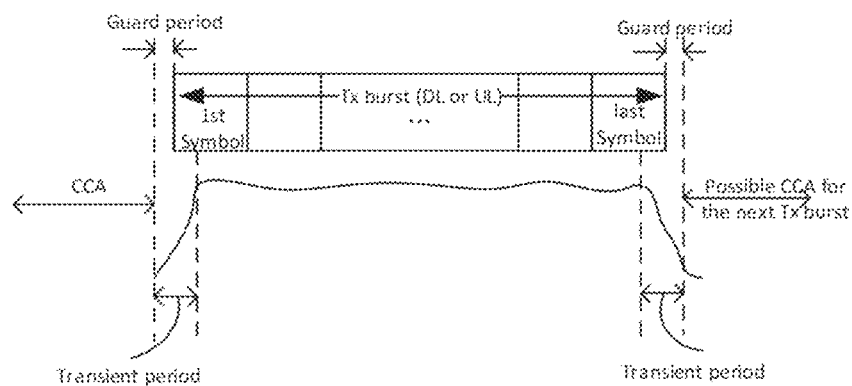
Figure 13:
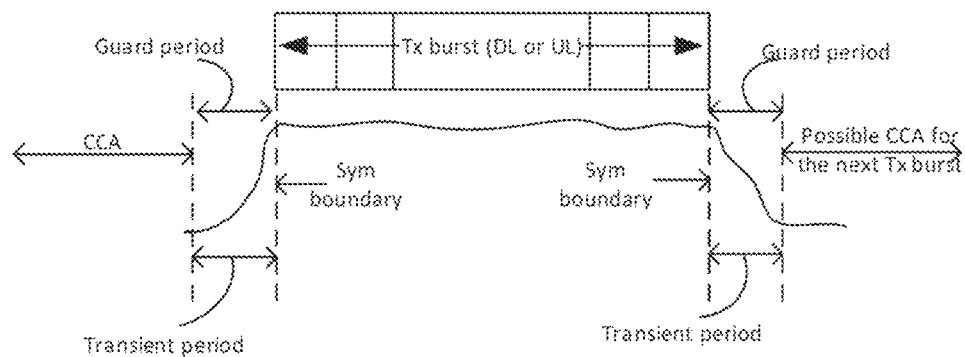

As mentioned, the time interval or guard period depends on the type of transmission. For instance, the lengths (durations) of the front and rear guard periods (or offsets, or explicit transient periods) may be determined by the type of channels/signals that are transmitted at the beginning and at the end, respectively (the first and/or last symbol) of the Tx burst. Examples of different lengths of guard periods are shown in FIGS. 11 to 13. Namely, the guard periods (time intervals between outer boundary of transient period and first/last symbol of the burst) shown range from zero to a value which is larger than the length of the transient period. Accordingly, as will be shown by the following examples, flexibility with respect to service requirements can be provided.

Firstly, if the guard period(s) is zero as shown in FIG. 11, the transient period is absorbed by the Tx burst itself. On the one hand, in this case, no "transient overhead," overhead due to the transient period, is generated. However, with the guard period being zero, the first and/or last symbols may be compromised, as discussed.

Secondly, if the guard period is non-zero but smaller than the transient period, as shown in FIG. 12, then the transient period is partially absorbed by the Tx burst and partially accommodated by the guard period. The guard period has been previously called an "explicit transient period." In the example of FIG. 12, the explicit transient period is equal to the part of the transient period which is accommodated by the guard period. Correspondingly, the remaining part of the transient period absorbed by the burst may be called an "implicit transient period." A non-zero guard period which is smaller than the transient period may be associated with an intermediate transient overhead and an intermediate impact on the first/last symbol(s).

Thirdly, if the guard period is equal to or larger than the transient period, as shown in FIG. 13, the transient period will lie completely outside the Tx burst. This causes the largest overhead from among the examples of FIGS. 11 to 13, but, at the same time, may facilitate providing good protection of the first/last symbols of the burst.

Figure 14:
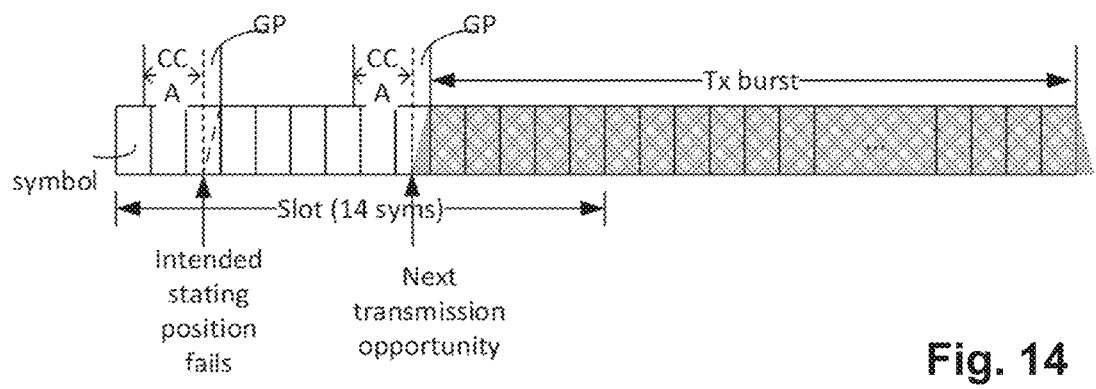
FIG. 14 is a schematic drawing showing a failed CCA and for a transmission a guard period.
Figure 15:
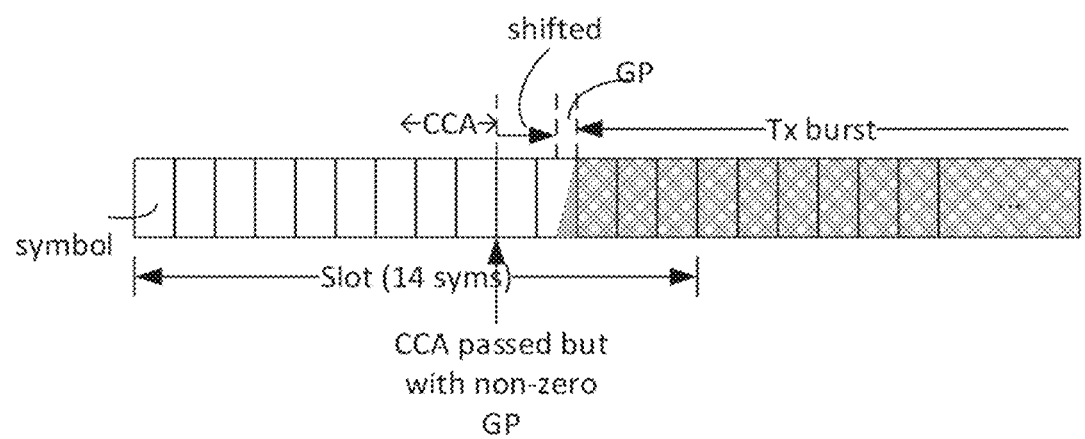
FIG. 15 is a schematic drawing showing a successful CCA and a guard period for a transmission.

In the following, the cases of successful and failed CCA before the start of a Tx burst will be discussed with reference to FIGS. 14 and 15. On the one hand, if the CCA fails and the value of the time interval is greater than zero, the transceiver, in operation, performs a new attempt of the CCA which terminates by the starting time of the transient period as shown in FIG. 14. The transmission of the Tx burst will be deferred to the next transmission opportunity with a new CCA (the new attempt) where the guard period remains. Accordingly, the time interval or time window in which the new CCA attempt is performed is still non-overlapping with the guard period. The time window or time interval for the earlier attempt of the CCA and the time interval/time window for the new attempt of the CCA may differ.

However, also if the CCA for the transmission succeeds at the symbol guard period but the guard period is non-zero, the guard period still needs to be respected. Accordingly, in some embodiments, as exemplified by FIG. 15, if the CCA is successful and the value of the time interval is greater than zero, the transmission (Tx burst) is deferred from a first transmission opportunity at an end of or after the CCA window to a second transmission opportunity (e.g., the next transmission opportunity), and a time distance from the end of the CCA window to the second transmission opportunity is equal or greater than the guard period. Moreover, in some cases, a new CCA needs to be performed before the second transmission opportunity even if the first CCA has succeeded. The purpose is to make sure that the channel is still free after shifting the transmission opportunity. But typically, the second CCA may have deterministic duration without random back-off value, such that it can be performed before the guard period of the second transmission opportunity.

In the following, some criteria for determining the length of the guard period will be described. For instance, if the starting or ending symbol (the first and/or last symbol of the burst) is important (being allocated an important signal), the guard period will have a larger duration for better protection. Otherwise, it may have a smaller duration to minimize or reduce the overhead.

Therein, a symbol may be "important" if it has got a high requirement for (quality of) service such as a reliability requirement, for example a symbol containing information which is needed for the reception, demodulation and/or decoding of the burst. Thus, in some embodiments, the above-mentioned type of transmission includes a service requirement for a type of the signal (or type of channel) transmitted on the symbol, and the guard period is longer if the service requirement is higher and shorter if the service requirement is lower.

For instance, the service requirement is higher if the type of signal is a control signal or a reference signal (RS) and lower if the type of signal is a preamble or a data signal. Accordingly, the service requirement is larger (and consequently, the guard period longer) for a symbol requiring a higher (quality of) service (priority/reliability) than for a symbol requiring a lower (quality of) service. Several examples of relationships between the guard period and the type of signal/channel with different service requirements are shown in FIGS. 16 to 20.

Figure 16:
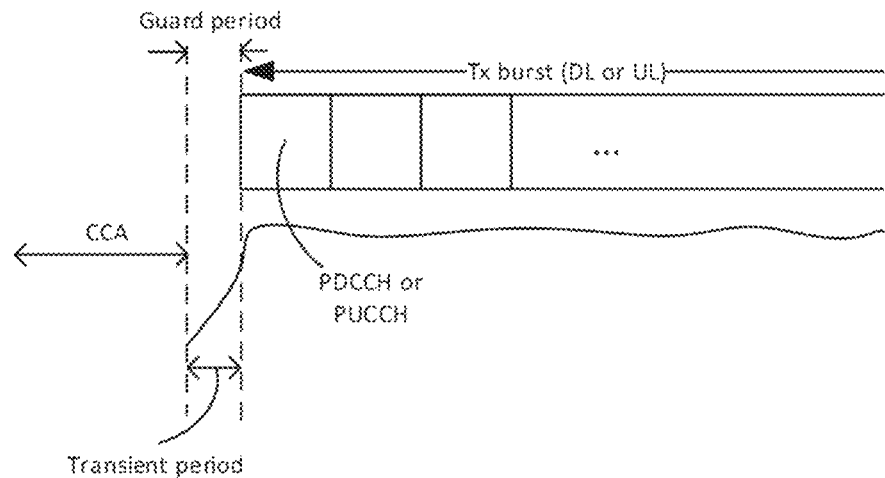
FIGS. 16 to 21 show different guard periods for different types of signal.
Figure 17:
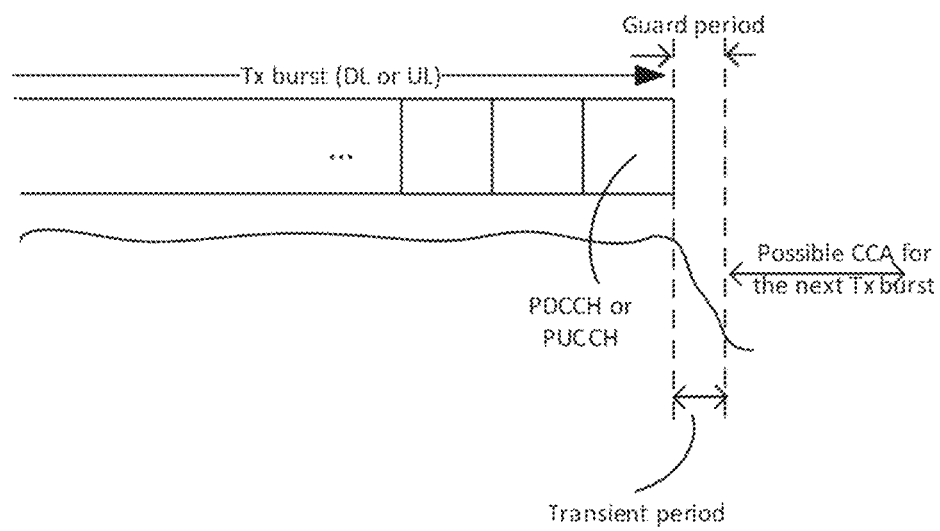

For instance, as shown in FIGS. 16 and 17, if a Tx burst starts or ends with a control channel such as PDCCH or PUCCH (physical downlink/uplink control channel) occupying the first or last symbol or more symbols at the start or end of the transmission, then the front guard period and/or rear guard period is determined to be large enough to accommodate the transient period, either completely or to a sufficiently large part.

Figure 18:
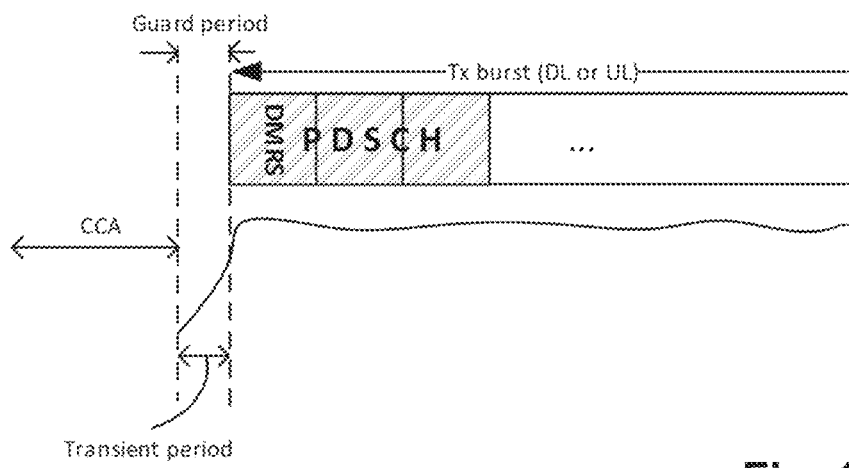
Figure 19:
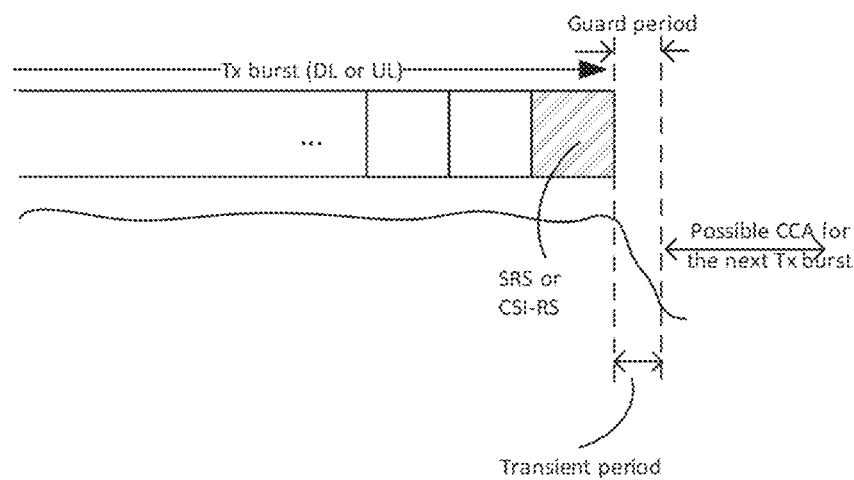

Likewise, if the guard period starts or ends with a reference signal, such as a front-loaded DMRS (demodulation reference signal) for PDSCH or PUSCH (physical downlink/uplink shared channel), a SRS (sounding reference signal), or a CSI-RS (channel state information reference signal), then the (front and/or rear) guard period is large enough to accommodate the transient period (completely or partially), as can be seen in FIGS. 18 and 19. In these Figures, a typical arrangement of RS in NR systems is shown including front-loaded DMRS at the start of a Tx burst. However, the present disclosure is also applicable to other RS at the start and/or end of the burst than shown in FIG. 18 or 19, such as CSI-RS or SRS at the start of a burst.

Figure 20:
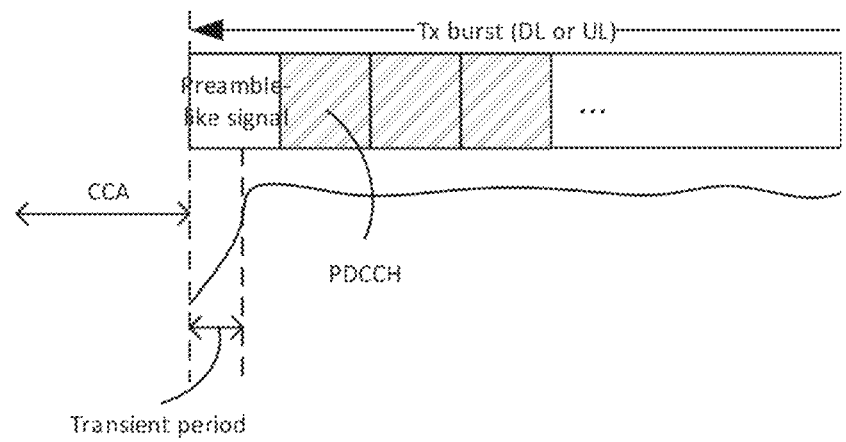

However, the front guard period may, e.g., be zero (or a smaller value than for the above cases) if the Tx burst starts with a preamble or preamble-like signal for NR-U. One possible use case being discussed is for AGC (automatic gain control) and/or synchronization adjustment, because the presence of the periodic signal such as SSB for UE to keep tracking AGC and synchronization may not be guaranteed due to uncertainty of LBT. Such preamble design can be based on the existing NR signals such as PSS (Primary Synchronization Sequence), SSS (Secondary Synchronization Sequence), DMRS, or CSI-RS with possible modifications, or new signal design. Even if the design of new preamble is based on DMRS or CSI-RS, it is not expected to be used for the channel estimation purpose because before AGC and/or synchronization are adjusted correctly, the reception including channel estimation is not possible or reliable. With such understanding, the service requirement for such new preamble is lower than that for reference signal used for channel estimation. Therefore, guard period can be set to smaller or zero value. This is shown in FIG. 20 where the OFF-to-ON transient period occurs within the burst at the start of the first symbol carrying the preamble-like signal.

As mentioned, in accordance with the present disclosure, the transient period at the start or end of a burst can be subdivided into an "explicit transient period" and an "implicit transient period." The implicit transient period is the part of the transient period that is absorbed by one or more starting or ending symbol(s) at the beginning or end of the burst, and the value of the implicit transient period is equal to "transient period minus guard period."

In accordance with the above discussed relationship between guard period and service requirement, the implicit transient period is smaller for "important" symbols (such as control and reference signals), and larger for less important symbols (on which the success of the transmission does not depend), such as data (in particular if a sufficient redundancy is provided) or the above-mentioned preamble or preamble-like signal.

Above, examples have been provided where the length of the guard period is based on a service requirement such as a necessary reliability of the transmission of some signal type. In addition or alternatively, in some embodiments, the type of the transmission includes a subcarrier spacing (SCS) of resources on which the transmission including the signal is to be performed, and the time interval between the outer boundary and the symbol where the signal is transmitted is shorter if the subcarrier spacing is narrower (smaller), whereas the time interval is longer if the subcarrier spacing is broader. The reasons include, on a high level, that the broader the SCS, the shorter the symbol duration. Consider the case where the defined time interval (or called guard period) is zero. As a result, the transient period would be absorbed by the symbol itself. Since the transient period does not vary according to the SCS, for a symbol with smaller duration (in other words, larger SCS), the percentage of the symbol duration that is damaged by the transient period would become larger, in comparison with a symbol with larger duration (in other words, smaller SCS). Therefore, longer time interval (or guard period) is required for the case of larger SCS.

Thus, in accordance with the above-disclosed relationship between SCS and guard period in some embodiments, the implicit transient period is larger for smaller for smaller SCS, and smaller for larger SCS. Accordingly, a more reliable transmission of the start or ending symbol of a Tx burst can also be facilitated for numerologies with wide SCSs where the symbol length is short.

Accordingly, rules or criteria based on which the guard period and the implicit transient period are determined take into account transmission types including a service requirement for a signal type and a SCS/numerology. These criteria may be combined or taken alone. For instance, one criterion from among the numerology criterion and the service requirement criterion is applied, or these criteria (and possibly further criteria) are combined. In combining the criteria, one criterion may be used as a preliminary criterion, and the other criterion may be used as a secondary criterion. For instance, it may be specified or configured for all that SCS equal to or above some threshold, a value of the guard period is used which is sufficient for accommodating the whole transient period, whereas for smaller SCS, the transient period depends on the signal type. Alternatively, the signal type may be taken as a preliminary criterion. In this case, for instance, whenever the first or last symbol of a burst is an important symbol where a signal such as DMRS or PDCCH/PUCCH is mapped, the guard period accommodates the whole transient period.

Figure 21:
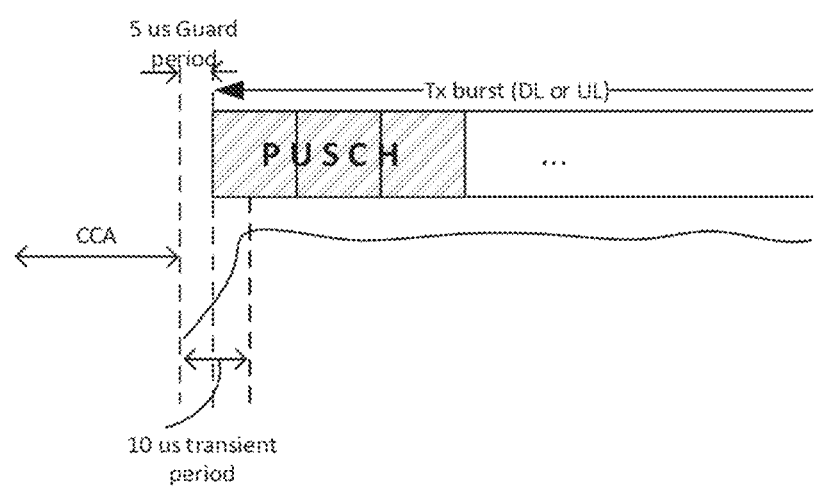

In the following Table 1, possible exemplary and non-limiting values of guard periods are shown respectively for several different combinations of frequency range (FR1 or FR2) and SCS with their associated symbol duration. For instance, the example shown in FIG. 21 corresponds to SCS=30 kHz in FR1, where a PUSCH is mapped to symbols including the first symbol. Here, as an exemplary value, the guard period is determined to be 5 us (rather than 10 us).

TABLE 1

Possible Guard Period Durations Dependent on SCS Usage in FR1 and FR2.

| FR | SCS | Symbol duration | Symbol including CP | Transient period | Guard period |
| --- | --- | --- | --- | --- | --- |
| FR1 | 15 kHz | 66.7 us | 71.4 us | 10 us | Zero |
| FR1 | 30 kHz | 33.34 us | 35.7 us | 10 us | 5 us |
| FR1 | 60 kHz | 16.7 us | 17.85 us | 10 us | 10 us |
| FR2 | 60 kHz | 16.7 us | 17.85 us | 5 us | 5 us |
| FR2 | 120 kHz | 8.34 us | 8.93 us | 5 us | 5 us |

As mentioned, the time boundary of the transmission may be a start boundary of the transmission. Then, in some embodiments, the UE transceiver 670, in operation, further receives, for instance in a grant (a scheduling grant such as a scheduling DCI (Downlink Control Information) through which the transmission is scheduled) or in higher-layer signaling (such as RRC, Radio Resource Control, signaling), an indication of the start boundary of the transmission. The UE circuitry 680, in operation, determines firstly the length of the time interval (or guard period) and then the outer boundary of the transient period from the indicated start boundary of the transmission and the length of the time interval. The UE transceiver 670 performs CCA for the transmission in accordance with the above description of the CCA time window/interval, and then ramps on the power in the transient period non-overlapping with the CCA period/window to start the transmission. In this disclosure, "indication" refers to one or more indicators such as bitmaps or bit fields representing numerical values such as the starting position of the burst.

In the following, it will be described how the UE is able to know the duration of the guard period. It is assumed that the set of rules defined and disclosed above, including for example the above criteria of numerology and/or service requirement, are known to both UE and base station/gNB, e.g., by a standard or specification.

For instance, to start transmitting a Tx burst the UE knows from the scheduling information the starting (symbol) position of the Tx burst, and other information such as SCS and/or whether the first symbol is an important symbol (e.g., DMRS or PDCCH). According to the known and previously defined rules, the UE derives the length of the guard period. It is the scheduler's (or the scheduling entity's) responsibility to create a sufficient gap for the CCA where no transmission is to be performed.

Figure 22:
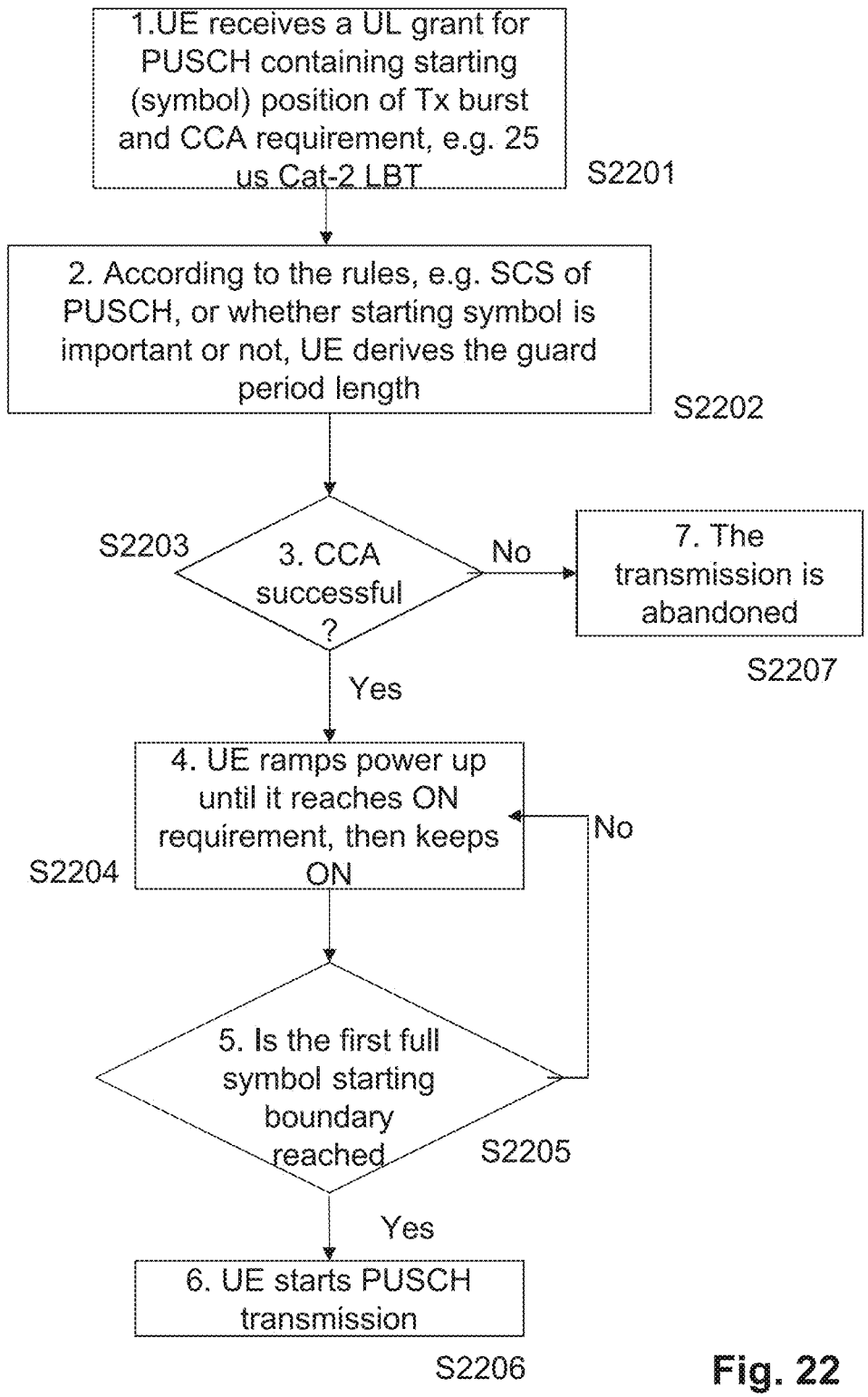
FIG. 22 is a flow chart showing steps to be performed by a UE at a start of a transmission.

More details on exemplary UE behavior for starting of a Tx burst including a PUSCH transmission are shown in FIG. 22. In step S2201, the UE receives a UL grant for PUSCH containing starting (symbol) position of Tx burst and CCA requirement, e.g., 25 us Cat-2 LBT (Category 2 Listen before talk). According to the rules such as service requirement or SCS/numerology, the UE derives the guard period length in step S2202. From the guard period length and the starting symbol position in the UL grant, the UE can determine the outer boundary of the transient period. The UE then performs CCA (step S2203). If the CCA is successful, the UE ramps the transmission power up, beginning at the outer boundary of the transient period, until it reaches ON requirement, then keeps the ON requirement (step S2204). During the ramping up of the power, it is tested (step S2205) whether or not the first full symbol boundary is reached. Here, it is assumed that the start of the transient period (the "outer boundary") is located between two symbol boundaries. If the first full symbol boundary is not yet reached, the UE keeps on ramping up the power. However, if the first full symbol boundary is reached, the UE starts the transmission of the Tx burst (in this case a PUSCH transmission). Depending on the length of the guard period and the transient period, the UE may still continue during PUSCH transmission. If the CCA is not successful, the transmission is abandoned, and a new CCA attempt may be performed, as describes above.

In the above described example of FIG. 22, the transmission is a PUSCH transmission, and it is assumed that the first symbol is a PUSCH symbol. The PUSCH is scheduled by a scheduling grant which the UE received from the base station. For different kinds of transmissions, which may include transmissions for which no dynamic grant in downlink control channel needs to be received, such as a configured grant based PUSCH transmission, the starting symbol position may be known to the UE from higher-layer (RRC) signaling received from the base station.

The above-described method used at the start of a Tx burst such as a PUSCH transmission may be considered implicit because the start of the transient period is implicitly known from the rules known to the UE and from the start of the transmission/Tx burst.

It is also possible to explicitly indicate the starting position of the transient period, e.g., in scheduling information. In this case, CCA should be performed before the indicated starting position of the transient period.

Examples of explicit indication of the starting position of transient period by DCI (Downlink Control Information) are provided in Table 2. In these examples, the first symbol of a slot ("Sym 0") is taken as a reference from which the start of the guard period is indicated by a two-bit code point. However, as Table 2 merely presents an example of explicit indication and is by no means intended to limit the present disclosure to some particular starting position of a burst or of the transient period/guard period. In contrast, a burst may start at transmission opportunities which may also be different from a first symbol of a slot. Furthermore, the present disclosure is applicable to non-slot-based assignment as well as slot-based assignment.

TABLE 2

Examples of Indicating Starting Positions by DCI

| Code point | Starting position (of transient period) | Length of guard period (assuming 15 kHz and 71.4 us symbol duration) |
| --- | --- | --- |
| 00 | Sym 0 | 0 us |
| 01 | Sym 0 + 16 us | 55.4 us (71.4 − 16) |
| 10 | Sym 0 + 25 us | 46.4 us (71.4 − 25) |
| 11 | Sym 0 + 25 us + TA | 71.4 − 25 − TA |

Figure 23:
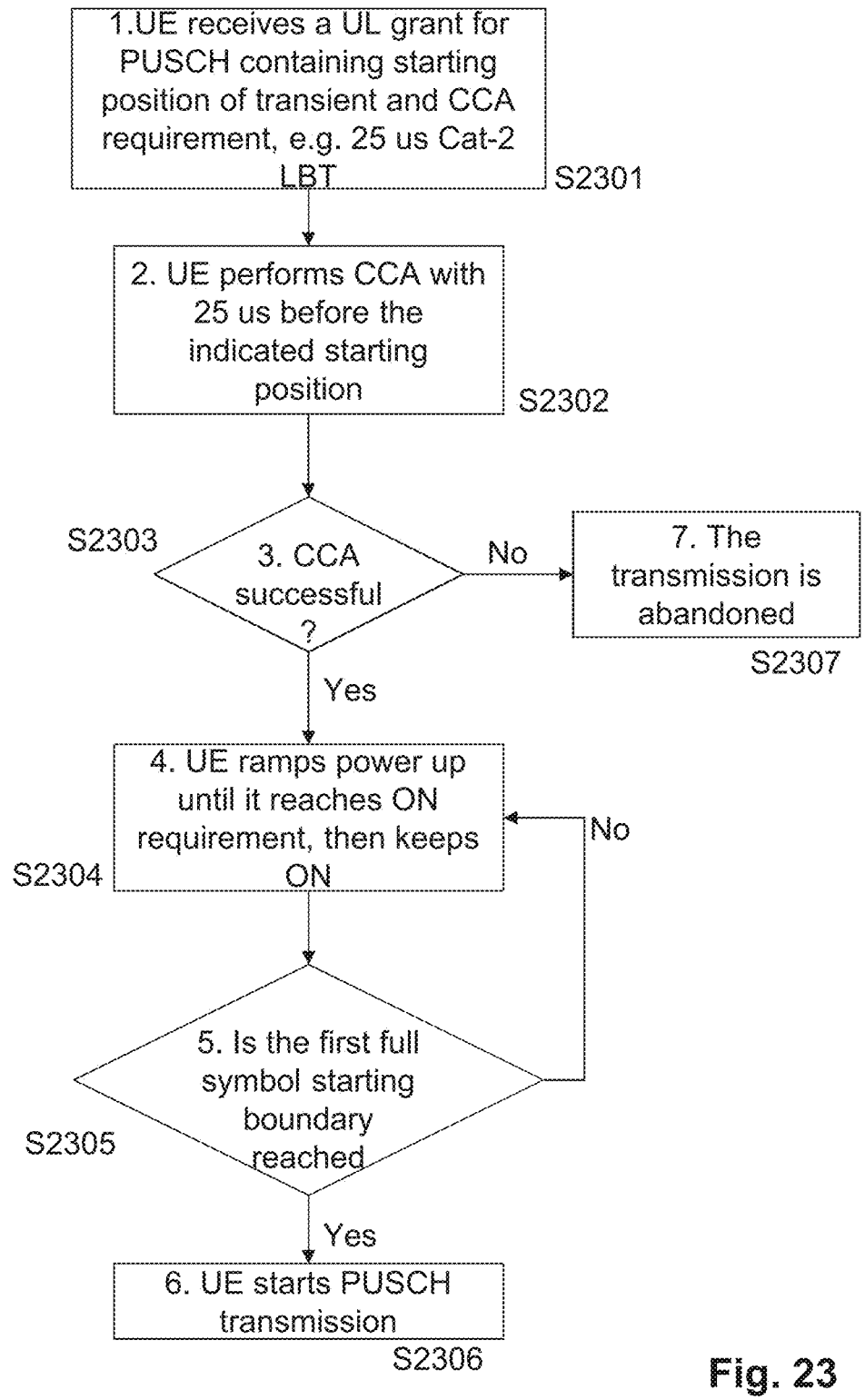
FIG. 23 is a flow chart showing an alternative example of steps to be performed by a UE at a start of the transmission.

In accordance with Table 2, when UE is indicated "00," UE starts first symbol of Tx burst at symbol 0 of any slot, meaning that the transient period will be absorbed by the symbol 0 itself. When UE is indicated "01," UE starts first (full) symbol of Tx burst at symbol 1 of any slot. UE starts the transient period at 16 us after symbol 0 boundary. When UE is indicated "10," UE starts first symbol of Tx burst at symbol 1 of any slot. UE starts the transient period at 25 us after symbol 0 boundary. Finally, when UE is indicated "11," UE starts first (full) symbol of Tx burst at symbol 1 of any slot. UE starts the transient period at 25 us+TimeAdvance value after symbol 0 boundary. An exemplary flow chart describing the steps performed at the start of a transmission in case of explicit indication is shown in FIG. 23, with steps S2301 and S2302 differing from FIG. 22. The remaining steps S2303 to S2307 are similar to the corresponding steps shown in FIG. 22.

In addition to the above example of the time boundary being a start boundary, in some embodiments, the time boundary is an end boundary of the transmission (the current transmission in which the signal is included). In such cases, the CCA may refer to a CCA for a future transmission different from the current transmission and possibly, but not necessarily, transmitted by a different communication device in the communication system such as another UE (e.g., UL transmission) or the base station (DL transmission). The UE transceiver 670, in operation, receives, in a grant or in higher-layer signaling, an indication of a start boundary of the current transmission and of a duration of a current transmission. The UE circuitry 680, in operation, derives the end boundary of the current transmission from the indicated start boundary and duration of the current transmission, and determines an inner boundary of the transient period to be located at a distance from the end boundary of the current transmission which is a difference between a length of the transient period and the time interval between the outer boundary of the transient period and the symbol.

Thus, in addition to the indication of the start boundary of the transmission (e.g., a position of the first symbol), the indication further indicates a duration of the transmission. For instance, there are two indicators (such as bit fields) in the scheduling grant/scheduling DCI or in higher layer signaling, one indicator indicating the start boundary and the other indicator indicating the duration. Both indicators may be included in the grant. However, it may also be the case that, e.g., the indicator of the start boundary of the transmission is included in the grant, and the indicator of the duration is included in the higher-layer signaling. Further, alternatively, a single bit-field may represent both the starting position and the length.

Thus, to finish transmitting a Tx (uplink) burst (the transmission including the signal), the UE knows where to start the transient period (i.e., to start ramping the power down). In particular, based on the above-mentioned indication/indicators and on the rules/criteria which are used for determining the length of the explicit guard period (or the time interval), the UE can determine the start of the transient period. In addition, the length of the transient period is known to the UE as well, because it is related to its own capability (such as the specific hardware and software of a UE) and the standard specifications already set a limit on such transient period, e.g., in accordance with the values shown in Table 1. Then the start of the ON-to-OFF guard period can be determined as "start of transmission+length of transmission−implicit transient period," wherein the implicit transient period equals "transient period−guard period."

Figure 24:
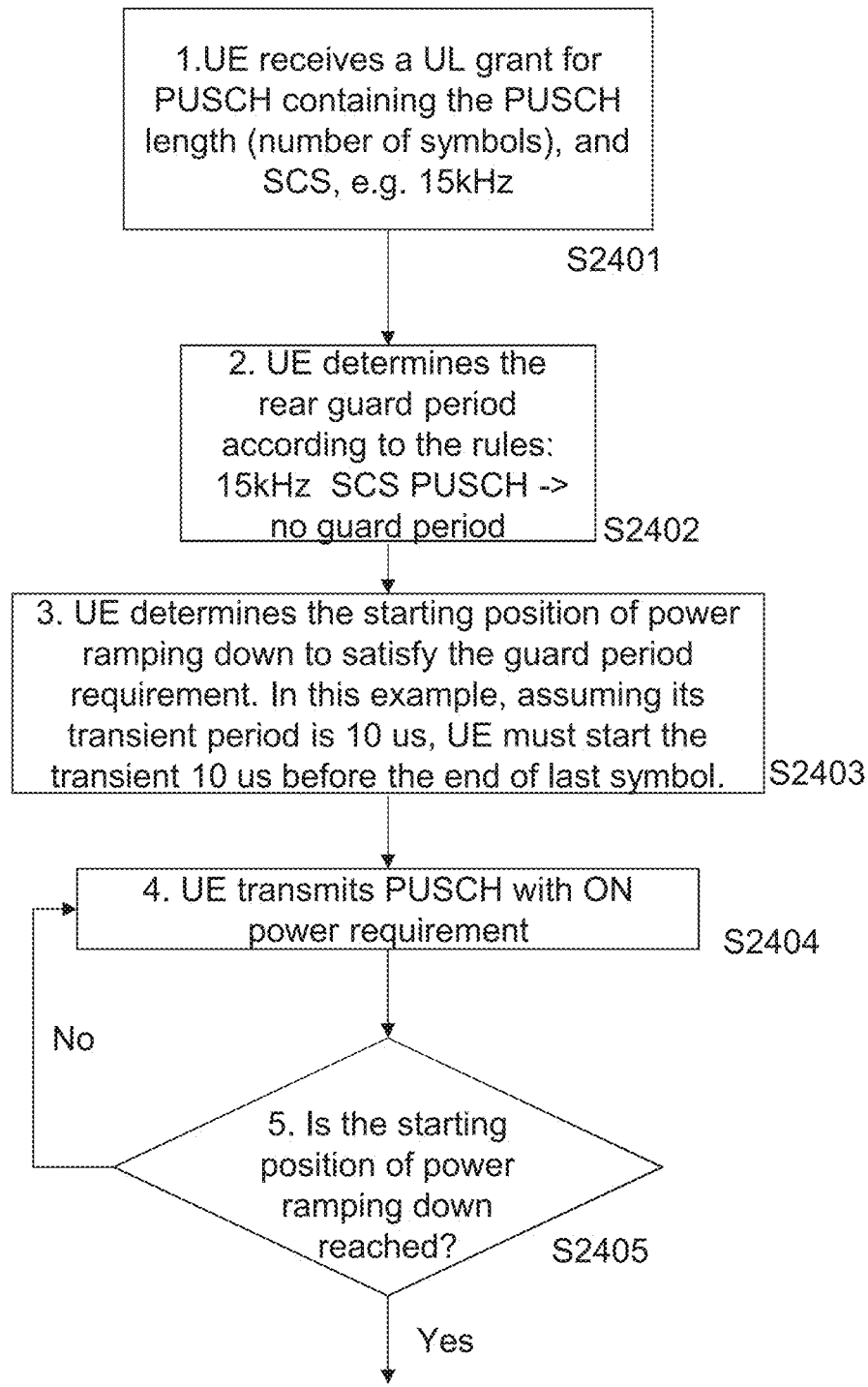
FIG. 24 is a flow chart showing steps to be performed by a UE at the end of a transmission.
Figure 24:
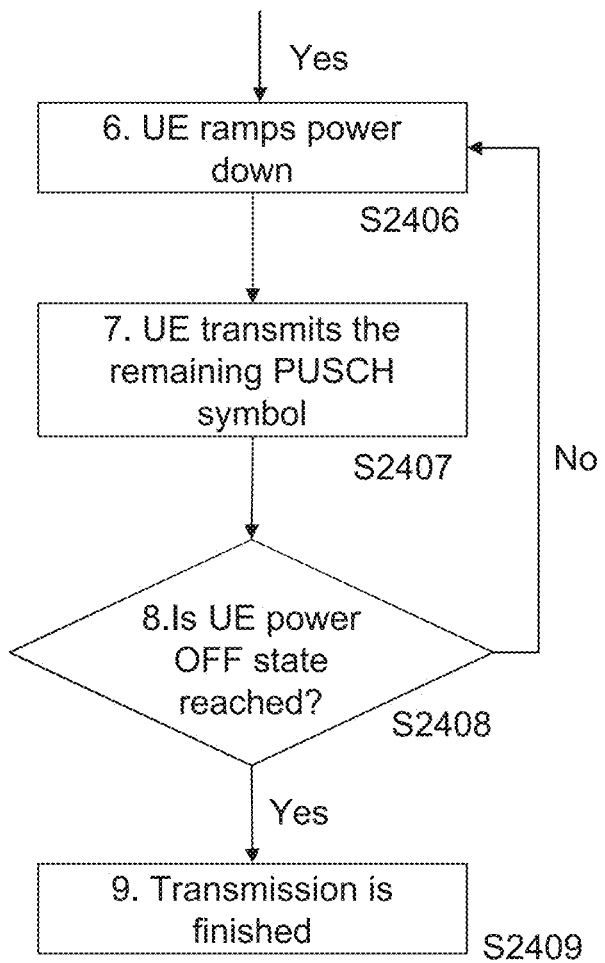

An example for steps performed by the UE at the end of an UL transmission are shown in FIG. 24. Firstly, in step S2401 the UE receives an UL grant for a PUSCH containing the PUSCH length, and an indication of the SCS (e.g., 15 kHz). As mentioned above, the grant may further contain an indication of the start of the transmission. Then, in step S2402, the UE determines the length of the rear guard period according to the known rules. For instance, it is determined that for a PUSCH and 15 kHz SCS, there is no guard period, as shown in FIG. 1. In step S2403, the UE determines the starting position of power ramping down to satisfy the guard period requirement. In this example, assuming its transient period is 10 us and that there is no guard period (zero guard period), the UE must start the transient 10 us before the end of last symbol. The UE performs the transmission of the PUSCH. Until the start of the on-to-OFF transient period, the UE transmits the PUSCH with the ON power requirement (S2404). If it is determined that the starting position of the transient period for ramping down the power is reached (S2405), the UE ramps the power down (S2406), and transmits, step S2407, the remaining PUSCH symbol (which, in the case that there is no guard period, overlaps with the transient period). If the UE power off state/requirement is reached (S2408), the transmission is finished (S2409).

In the cases above, the UE behavior in case of an uplink transmission from UE to base station has been described. Regarding downlink transmissions, to receive a DL Tx burst from the beginning and to start the reception of the burst, the UE may follow the scheduling information which tells the UE the first full symbol. Whether the first full symbol contains a transient period or not (i.e., the transient period lies before the first symbol or not), is transparent to the UE. Also at the end of a DL transmission, to receive a Tx burst at the end, the UE may follow the scheduling information which tells the UE the last (full) symbol, Whether or the last symbol contains the transient period is transparent to the UE.

In accordance with the above-described UE behavior, it may be provided that no special mapping (from coded bit or reference signal to physical resources) for the first and the last symbol is needed, independent of whether or not the first/last symbol contains the transient period. No special handling of the first and the last symbol at the receiver side may be needed, independent of whether or not the first/last symbol contains the transient period.

Embodiments have been described above where the time interval between the outer boundary of the transient period and the symbol on which the signal is transmitted corresponds to a guard period inserted before the first symbol or after the last symbol of the Tx bursts. However, the present disclosure also covers embodiments where no guard period is inserted (the guard period is zero independent of the transmission type). In such embodiments, a sufficiently large time interval between the start of the transient period and a symbol onto which an essential (important) signal/information is mapped can be implemented by not using the starting and ending symbols (the first and last symbols of the burst) for carrying the essential information such as reference signal(s) or control information.

In the above disclosure, SCS/numerology and service requirement have been named as criteria for rules based on which a guard period is determined. Other requirements or criteria, for the transient period, as may be applied to licensed band usage, may be applied in addition to, in combination with, or on top of the rules described so far. Accordingly, in some embodiments, the type of transmission includes a duration of the transmission, and the guard period is longer if the duration of the transmission is shorter and shorter if the duration of the transmission is longer. For instance, it may be required that if the transmission burst is short, the transient period should be outside the Tx burst.

Accordingly, in some embodiments, wherein the signal transmitted on the symbol is a first signal, the transmission includes a second symbol having a lower service requirement than the first symbol. The (UE or base station) circuitry 630, 680 determines the time interval between the outer boundary of the transient period and the symbol on which the first signal is to be transmitted by swapping symbol positions of the first signal and the second signal so as to increase the time interval. Thus, the interval between the outer boundary of the transient period and the symbol with the first signal is established by swapping (exchanging/switching) symbol positions and thereby moving the symbol with the first signal to an interior symbol position remote from or not adjacent to the outer boundary of the transient period. For instance, for a data channel, if the Tx burst is originally intended to start or end with an essential reference signal on the first or last symbol, then the starting or ending symbol is swapped, e.g., with the second symbol (or the second last symbol).

For instance, the UE receives, from the base station, in a grant or higher layer signaling, a flag indicating whether or not the symbol positions are to be swapped, and performs the swapping of the symbol positions in accordance with the flag if the transmission is an UL transmission. In the case of a DL transmission, the base station performs the swapping, and the flag tells the UE which signals are to be received (demodulated, decoded) on which symbols in which order.

For example, the scheduling DCI contains the flag for indicating swapping to the UE. The flag may be a one bit flag indicating whether or not swapping is to be performed, or a respective bit may be provided for the start of the burst and the end of the burst. Alternatively, more than one bit may be provided, e.g., to indicate the symbol with which the starting symbol and/or ending symbol is to be swapped.

Some embodiments may be based on an agreement that a control channel is not to be mapped onto starting and/or ending symbols. Then, the receiving device does not expect to receive and does not try to decode a control channel such as PDCCH or PUCCH. For instance, the agreement may be made by a standard (e.g., no control channel on starting/ending symbols for particular SCSs), or may be configured. In case of such an agreement, a dedicated flag for indicating the swapping may not be required to be signaled.

In this disclosure, FR1 and FR2 have been mentioned as exemplary frequency bands for unlicensed operation in NR, and SCSs and requirements for the transient period have been provided. However, the techniques disclosed herein may also be applied to other frequency ranges such as higher frequency bands. In certain cases, it may happen that the transient period has a longer duration than one symbol (e.g., for very large SCS). The techniques disclosed herein can also be applied to such cases. For instance, for large SCS, the guard period may be chosen to be sufficiently large that sufficient reliability is also provided for the second symbol or the second last symbol in a Tx burst. Alternatively, in case of swapping essential symbols with other symbols, the first symbol may for instance change positions with the third or fourth symbol in the burst rather than with the second symbol.

Figure 25:
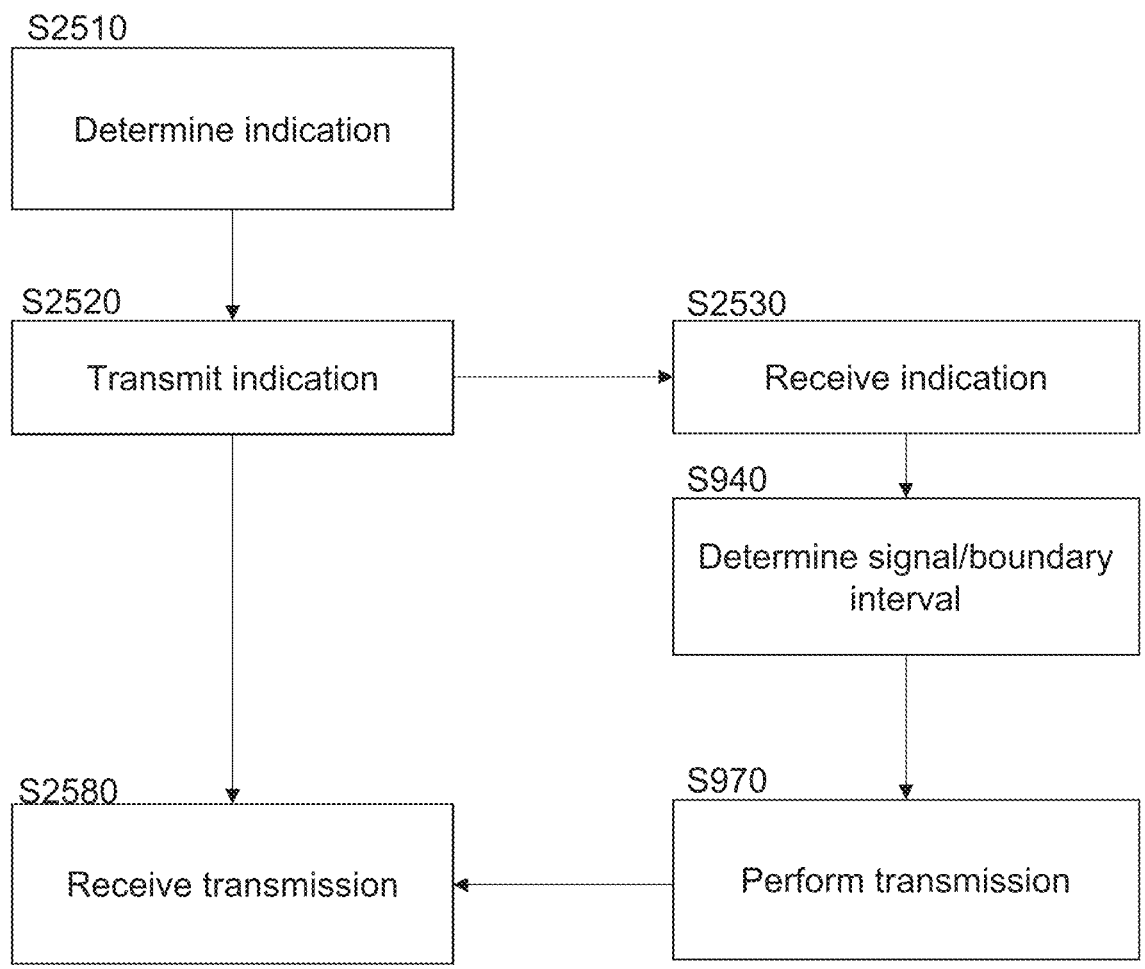
FIG. 25 is a flow chart showing a communication method for a base station and a UE.

Some embodiments have been described where the transmission is an uplink transmission from a UE to a base station. Exemplary method steps of an uplink transmission method are shown in FIG. 25. The base station determines an indication S2510 of start of a transmission such as an uplink burst and possibly of the length (e.g., number of symbols) of the transmission. The base station further transmits S2520 the indication to the UE in a grant or in higher-layer signaling. The UE receives S2530 the indication and based thereon and on the rules for determining the guard period, determines the time interval between outer boundary and signal on which the symbol is transmitted, and performs the transmission accordingly (steps S940 and S970 from FIG. 9) which is received S2580 by the base station.

In general, the present disclosure is applicable for downlink as well as for uplink transmissions. In the case of downlink transmissions, the base station (the transmitting device) determines the boundaries of the transmission and the (inner and/or outer) boundaries of the guard period, sends indications of the start of the transmission and, if needed, of the duration of the transmission in higher-layer signaling or in a scheduling DCI/assignment, performs the CCA and performs the transmission.

Moreover, in the present disclosure, any mention of performing a transmission (of a burst, grant, signaling etc.) by a transmitting device (UE or base station) implies that the transmission may be received by the corresponding receiving device (base station or UE).

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Provided is a user equipment, UE, comprising circuitry which, in operation, determines, based on a type of a transmission, a time interval between an outer boundary of a transient period for ramping of power to start or finish the transmission and a symbol on which a signal included in the transmission is to be transmitted; and a transceiver which, in operation, transmits the signal on the symbol; wherein the time interval and a time window for clear channel assessment, CCA, are non-overlapping.

In some embodiments, the symbol on which the signal is transmitted is at a time boundary of the transmission.

For instance, the type of the transmission includes a service requirement for a type of the signal, and the time interval is longer if the service requirement is higher and shorter if the service requirement is lower.

For example, the service requirement is higher if the type of the signal is a control signal or a reference signal and lower if the type of the signal is a preamble or a data signal.

In some embodiments, the type of the transmission includes a subcarrier spacing of resources on which the transmission including the signal is to be performed, and the time interval is shorter if the subcarrier spacing is narrower and longer if the subcarrier spacing is broader.

In some exemplary embodiments, the time boundary of the transmission is a start boundary, the transceiver, in operation, receives, in a grant or higher layer signaling, an indication of the start boundary of the transmission, the circuitry, in operation, determines the outer boundary of the transient period based on the indication and the time interval, and the transceiver, in operation, performs the CCA for the transmission and ramps on the power in the transient period to start the transmission.

In some exemplary embodiments, the signal is included in a current transmission and the CCA is a CCA for a future transmission, the time boundary is an end boundary of the current transmission, the transceiver, in operation, receives, in a grant or in higher layer signaling, an indication of a start boundary of the current transmission and of a duration of the current transmission, the circuitry, in operation, derives the end boundary of the current transmission from the indicated start boundary and duration of the current transmission, and determines an inner boundary of the transient period to be located at a distance from the end boundary of the current transmission which is a difference between a length of the transient period and the time interval. For instance, if the CCA is successful and the value of the time interval is greater than zero, the transmission is deferred from a first transmission opportunity at an end of the CCA window to a second transmission opportunity, and a time distance from the end of the CCA window to the second transmission opportunity is greater than the time interval.

For example, if the CCA fails and the value of the time interval is greater than zero, the transceiver, in operation, performs a new attempt of the CCA which terminates by the starting time of the transient period.

In some embodiments, the type of transmission includes a duration of the transmission, and the time interval is longer if the duration of the transmission is shorter and shorter if the duration of the transmission is longer.

For instance, the signal transmitted on the symbol is a first signal, the transmission includes a second symbol having a lower service requirement than the first symbol, and the circuitry, in operation, determines the time interval between the outer boundary of the transient period and the symbol on which the first signal is to be transmitted by swapping symbol positions of the first signal and the second signal so as to increase the time interval.

For instance, the transceiver, in operation, receives, in a grant or higher layer signaling, a flag indicating whether or not the symbol positions are to be swapped, and the circuitry performs the swapping of the symbol positions in accordance with the flag.

Also provided is a user equipment, UE, comprising circuitry which, in operation, determines, based on a type of a transmission, a time interval between an outer boundary of a transient period for ramping of power to start or finish the transmission and a symbol on which a signal included in the transmission is to be transmitted; and a transceiver which, in operation, receives the signal on the symbol; wherein the time interval and a time window for clear channel assessment, CCA, are non-overlapping.

In some embodiments, the symbol on which the signal is received is at a time boundary of the transmission.

For instance, the type of the transmission includes a service requirement for a type of the signal, and the time interval is longer if the service requirement is higher and shorter if the service requirement is lower.

For example, the service requirement is higher if the type of the signal is a control signal or a reference signal and lower if the type of the signal is a preamble or a data signal.

In some embodiments, the type of the transmission includes a subcarrier spacing of resources on which the transmission including the signal is to be performed, and the time interval is shorter if the subcarrier spacing is narrower and longer if the subcarrier spacing is broader.

For example, the type of transmission includes a duration of the transmission, and the time interval is longer if the duration of the transmission is shorter and shorter if the duration of the transmission is longer.

For instance, the signal received on the symbol is a first signal, the transmission includes a second symbol having a lower service requirement than the first symbol, and the circuitry, in operation, determines the time interval between the outer boundary of the transient period and the symbol on which the first signal is to be received by swapping symbol positions of the first signal and the second signal so as to increase the time interval.

For instance, the transceiver, in operation, receives, in an assignment or higher layer signaling, a flag indicating whether or not the symbol positions are to be swapped, and the signal is received with symbol positions swapped positions in accordance with the flag.

Further provided is a base station comprising circuitry which, in operation, determines, based on a type of a transmission, a time interval between an outer boundary of a transient period for ramping of power to start or finish the transmission and a symbol on which a signal included in the transmission is to be transmitted and a transceiver which, in operation, receives or transmits the signal on the symbol, wherein the time interval and a time window for clear channel assessment, CCA, are non-overlapping.

In some embodiments, the symbol on which the signal is transmitted is at a time boundary of the transmission.

For instance, the type of the transmission includes a service requirement for a type of the signal, and the time interval is longer if the service requirement is higher and shorter if the service requirement is lower.

For example, the service requirement is higher if the type of the signal is a control signal or a reference signal and lower if the type of the signal is a preamble or a data signal.

In some embodiments, the type of the transmission includes a subcarrier spacing of resources on which the transmission including the signal is to be performed, and the time interval is shorter if the subcarrier spacing is narrower and longer if the subcarrier spacing is broader.

In some exemplary embodiments, the time boundary of the transmission is a start boundary, the circuitry, in operation, determines an indication of the start boundary of the transmission based on which the outer boundary of the transient period is derivable, the transceiver, in operation, transmits, in a grant or higher layer signaling, the indication of the start boundary of the transmission, and receives the transmission in accordance with the indication.

In some embodiments, the signal is included in a current transmission and the CCA is a CCA for a future transmission, the time boundary is an end boundary of the current transmission, the circuitry, in operation, determines a start boundary of the current transmission and of a duration of the current transmission, the transceiver transmits, in a grant or in higher layer signaling, an indication of the start boundary of the current transmission and of the duration of the current transmission, and receives the transmission in accordance with the indication.

In some embodiments, the type of transmission includes a duration of the transmission, and the time interval is longer if the duration of the transmission is shorter and shorter if the duration of the transmission is longer.

For instance, the signal transmitted on the symbol is a first signal, the transmission includes a second symbol having a lower service requirement than the first symbol, and the circuitry, in operation, determines the time interval between the outer boundary of the transient period and the symbol on which the first signal is to be transmitted or received by swapping symbol positions of the first signal and the second signal so as to increase the time interval.

For instance, the transceiver, in operation, transmits, in a grant or assignment or in higher layer signaling, a flag indicating whether or not the symbol positions are to be swapped, and the transmission is received or performed with symbol positions swapped in accordance with the flag.

Summarizing, provided are a user equipment (UE), a base station and respective transmission/reception methods for UE and base station. The UE comprises circuitry which, in operation, determines, based on a type of a transmission, a time interval between an outer boundary of a transient period for ramping of power to start or finish the transmission and a symbol on which a signal included in the transmission is to be transmitted; and a transceiver which, in operation, transmits the signal on the symbol; wherein the time interval and a time window for clear channel assessment, CCA, are non-overlapping.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated circuit for controlling a user equipment (UE), the integrated circuit comprising:
control circuitry which, in operation, determines, based on a type of a transmission, a time interval between an outer boundary of a transient period for ramping of power to start or finish the transmission and a symbol on which a signal included in the transmission is to be transmitted; and
transceiver circuitry which, in operation, transmits the signal on the symbol; wherein
the time interval and a time window for clear channel assessment (CCA) are non-overlapping,
the symbol on which the signal is transmitted is at a time boundary of the transmission,
the signal is included in a current transmission and the CCA is a CCA for a future transmission,
the time boundary is an end boundary of the current transmission,
the transceiver circuitry, in operation, receives, in a grant or in higher layer signaling, an indication of a start boundary of the current transmission and of a duration of the current transmission,
the control circuitry, in operation, derives the end boundary of the current transmission from the indicated start boundary and duration of the current transmission, and determines an inner boundary of the transient period to be located at a distance from the end boundary of the current transmission which is a difference between a length of the transient period and the time interval, and
the type of the transmission includes a service requirement for a type of the signal, and the time interval is longer if the service requirement is higher and shorter if the service requirement is lower.

2. The integrated circuit according to claim 1, wherein the service requirement is higher if the type of the signal is a control signal or a reference signal and lower if the type of the signal is a preamble or a data signal.

3. The integrated circuit according to claim 1, wherein the type of transmission includes a duration of the transmission, and the time interval is longer if the duration of the transmission is shorter and shorter if the duration of the transmission is longer.

4. The integrated circuit according to claim 1, wherein the type of the transmission includes a subcarrier spacing of resources on which the transmission including the signal is to be performed, and the time interval is shorter if the subcarrier spacing is narrower and longer if the subcarrier spacing is broader.

5. The integrated circuit according to claim 1, wherein
the time boundary of the transmission is a start boundary,
the transceiver circuitry, in operation, receives, in a grant or higher layer signaling, an indication of the start boundary of the transmission,
the control circuitry, in operation, determines the outer boundary of the transient period based on the indication and the time interval, and
the transceiver circuitry, in operation, performs the CCA for the transmission and ramps on the power in the transient period to start the transmission.

6. The integrated circuit according to claim 5, wherein, if the CCA is successful and the value of the time interval is greater than zero, the transmission is deferred from a first transmission opportunity at an end of the CCA window to a second transmission opportunity, and a time distance from the end of the CCA window to the second transmission opportunity is greater than the time interval.

7. The integrated circuit according to claim 5, wherein, if the CCA fails and the value of the time interval is greater than zero, the transceiver, in operation, performs a new attempt of the CCA which terminates by the starting time of the transient period.

8. The integrated circuit according to claim 1, wherein the signal transmitted on the symbol is a first signal, and the transmission includes a second symbol having a lower service requirement than the first symbol, and
the control circuitry, in operation, determines the time interval between the outer boundary of the transient period and the symbol on which the first signal is to be transmitted by swapping symbol positions of the first signal and the second signal so as to increase the time interval.

9. The integrated circuit according to claim 8, wherein the transceiver circuitry, in operation, receives, in a grant or higher layer signaling, a flag indicating whether or not the symbol positions are to be swapped, and
the control circuitry performs the swapping of the symbol positions in accordance with the flag.

* * * * *